US010725252B1

(12) United States Patent
Leigh et al.

(10) Patent No.: US 10,725,252 B1
(45) Date of Patent: Jul. 28, 2020

(54) MODULAR OPTICAL FERRULE ADAPTER AND CARRIER SYSTEMS FOR CUSTOMIZABLE OPTICAL CONNECTIVITY AND HAVING MOVEABLE FERRULE CARRIERS

(71) Applicant: Hewlett Packard Enterprise Development LP, Houston, TX (US)

(72) Inventors: Kevin B. Leigh, Houston, TX (US); John Norton, Houston, TX (US); Sagi Mathai, Palo Alto, CA (US); Ashkan Seyedi, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/503,176

(22) Filed: Jul. 3, 2019

(51) Int. Cl.
*G02B 6/40* (2006.01)
*G02B 6/38* (2006.01)

(52) U.S. Cl.
CPC .......... *G02B 6/406* (2013.01); *G02B 6/3825* (2013.01); *G02B 6/3874* (2013.01)

(58) Field of Classification Search
CPC ..... G02B 6/406; G02B 6/3874; G02B 6/3825
See application file for complete search history.

(56) References Cited

U.S. PATENT DOCUMENTS

| | | | |
|---|---|---|---|
| 4,279,469 A * | 7/1981 | Forman | G02B 6/3825 385/54 |
| 4,444,461 A | 4/1984 | Wey et al. | |
| 5,212,745 A | 5/1993 | Miller | |
| 5,289,552 A * | 2/1994 | Miller | G02B 6/241 356/480 |
| 5,325,454 A | 6/1994 | Rittle et al. | |
| 5,452,388 A * | 9/1995 | Rittle | G02B 6/3849 385/89 |
| 5,598,495 A * | 1/1997 | Rittle | G02B 6/3849 385/75 |
| 6,443,627 B1 | 9/2002 | Anderson et al. | |
| 8,213,791 B2 | 7/2012 | Kojima et al. | |
| 8,873,922 B2 | 10/2014 | Kowalczyk et al. | |
| 9,176,284 B2 * | 11/2015 | Megason | G02B 6/3831 |
| 9,442,005 B2 | 9/2016 | Fusco et al. | |

(Continued)

OTHER PUBLICATIONS

Belden; "Belden® Optical Fiber Catalog"; printed from webpage: http://www.farnell.com/datasheets/1582245.pdf on Jun. 23, 2019; 64 pages.

(Continued)

*Primary Examiner* — Andrew Jordan
(74) *Attorney, Agent, or Firm* — Sheppard Mullin Richter & Hampton LLP

(57) ABSTRACT

Systems and apparatuses are disclosed for flexible, mating force-managed optical connections using a plurality of optical connectors and ferrule carrier adapters. Each of the plurality of ferrule carriers comprise a plurality of duplex ferrules disposed within ferrule bays of the ferrule carrier. A bracket of the optical connector gangs the plurality of ferrule carriers together. Ferrule carrier adapters are configured to accept a plurality of optical connectors for inline or orthogonal mating. Each ferrule carrier within the optical connectors is independently floated on the bracket, allowing each ferrule carrier to be mated and demated independently of any other ferrule carrier in the optical connector.

20 Claims, 24 Drawing Sheets

(56) References Cited

U.S. PATENT DOCUMENTS

| | | | |
|---|---|---|---|
| 10,072,972 B2* | 9/2018 | Fusco | G01J 1/0271 |
| 10,591,681 B2* | 3/2020 | Smith | G02B 6/3874 |
| 2002/0090177 A1* | 7/2002 | Anderson | G02B 6/3825 |
| | | | 385/60 |
| 2010/0008676 A1* | 1/2010 | Kojima | G02B 6/424 |
| | | | 398/141 |
| 2012/0189260 A1* | 7/2012 | Kowalczyk | G02B 6/44 |
| | | | 385/135 |
| 2014/0334779 A1* | 11/2014 | Megason | G02B 6/381 |
| | | | 385/62 |
| 2016/0033325 A1* | 2/2016 | Fusco | G02B 6/4225 |
| | | | 356/73.1 |
| 2017/0131140 A1* | 5/2017 | Fusco | G01J 1/0425 |
| 2019/0018204 A1 | 1/2019 | Smith et al. | |
| 2019/0250344 A1* | 8/2019 | Takano | G02B 6/3893 |
| 2019/0285806 A1* | 9/2019 | Takano | G02B 6/3893 |
| 2019/0377139 A1* | 12/2019 | Chang | G02B 6/3893 |
| 2020/0018909 A1* | 1/2020 | Chang | G02B 6/4292 |
| 2020/0049904 A1* | 2/2020 | Chang | G02B 6/3881 |

OTHER PUBLICATIONS

Nakama, A. et al.; "Lensed Connector for Single Mode Fiber"; Dec. 20, 2018; 3 pages.

* cited by examiner

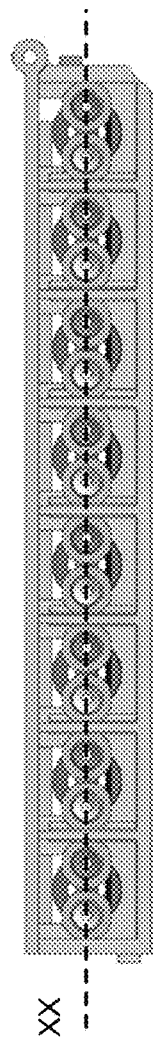
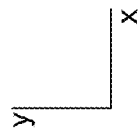
FIG. 2C
FIG. 2B

420A

420C

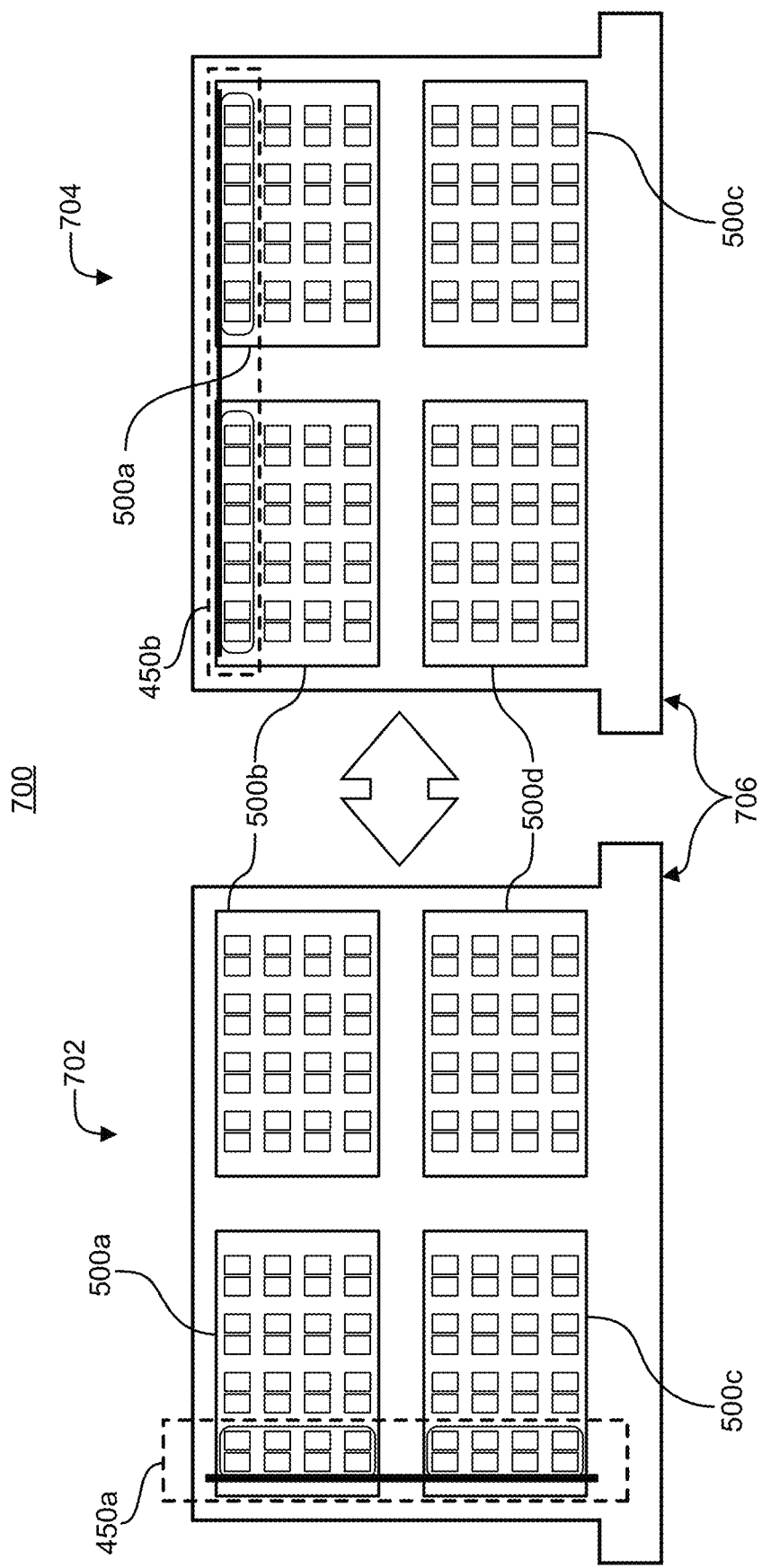

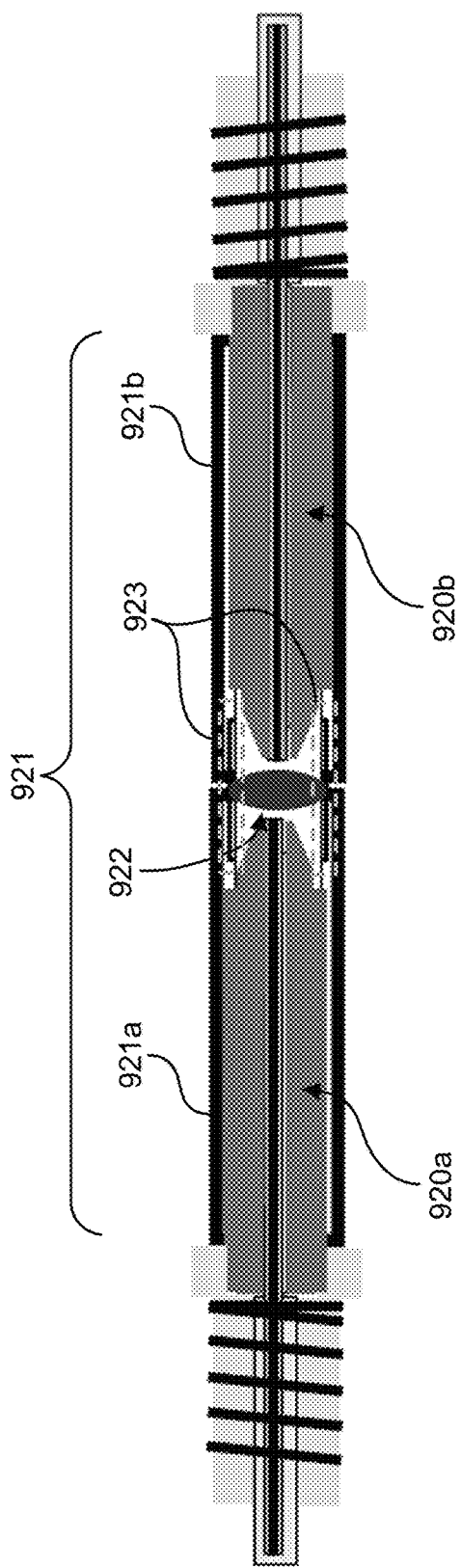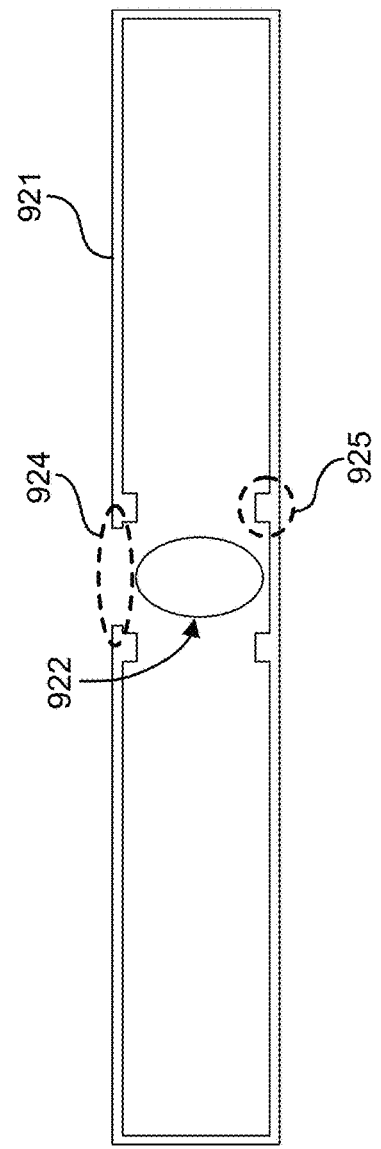
FIG. 10A
FIG. 10B

MODULAR OPTICAL FERRULE ADAPTER AND CARRIER SYSTEMS FOR CUSTOMIZABLE OPTICAL CONNECTIVITY AND HAVING MOVEABLE FERRULE CARRIERS

DESCRIPTION OF RELATED ART

An optical fiber connector terminates the end of an optical fiber, serving to mechanically couple and align fiber cores for optical coupling. There are a variety of different types of fiber connectors known in the art, each designed to work best for specific types of system designs. The simplest type of fiber connector is the simplex ferrule, a ceramic or metal ferrule configured to accept a single fiber core of an optical fiber. Duplex ferrules, comprising two simplex ferrules paired together within a single connector housing, enable transmit and receive communication of a single fiber to be available through a single connector, rather than requiring each fiber core (i.e., the transmit fiber core and the receive fiber core) to have its own, independent constructed simplex ferrule housing. Some example simplex or duplex ferrule connectors include SC, LC, FC, MDC, CS, and SN connectors.

Another type of optical fiber connector is the parallel fiber connector. Unlike the duplex ferrules, parallel fiber connector (like MT and PRIZM MT connectors) enable multiple fibers to be terminated in a single connector (like MPO/MTP and MXC), increasing fiber density. Parallel fiber connectors, having similar housing size than common duplex ferrule connectors but six to 32 times more fibers, enable higher-density fiber management within the system, increasing the overall bandwidth. However, the increased number of fiber connections within the parallel fiber connectors increases the complexity required for routing the various transmit/receive pairs (for duplex communication) to different chips or faceplate connectors (including blindmate connectors) for node-to-node connections. Such routing requires the need for expensive and complex breakout boxes or fiber shuffles to make all the necessary connections for many-to-many connectivity. In many instances, entire racks of fiber shuffles may be required, each fiber shuffle limiting flexibility for future reconfigurations and increasing scalability challenges due to the inflexible nature of such devices.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Some of the figures included herein illustrate various embodiments of the invention from different viewing angles. Although the accompanying descriptive text may refer to elements depicted therein as being on the "top," "bottom" or "side" of an apparatus, such references are merely descriptive and do not imply or require that the invention be implemented or used in a particular spatial orientation unless explicitly stated otherwise.

FIG. 2B shows an example parallel configuration ferrule carrier in accordance with embodiments of the technology disclosed herein.

FIG. 2C shows an example serial configuration ferrule carrier in accordance with embodiments of the technology disclosed herein.

FIG. 7A illustrates a first side of an example adapter apparatus in accordance with embodiments of the technology disclosed herein.

FIG. 7B illustrates a second side of an example adapter apparatus in accordance with embodiments of the technology disclosed herein.

FIG. 10A shows an example construction of a mating sleeve of FIG. 9D in accordance with embodiments of the technology disclosed herein.

FIG. 10B shows another example construction of a mating sleeve of FIG. 9D in accordance with embodiments of the technology disclosed herein.

Figure 1A:
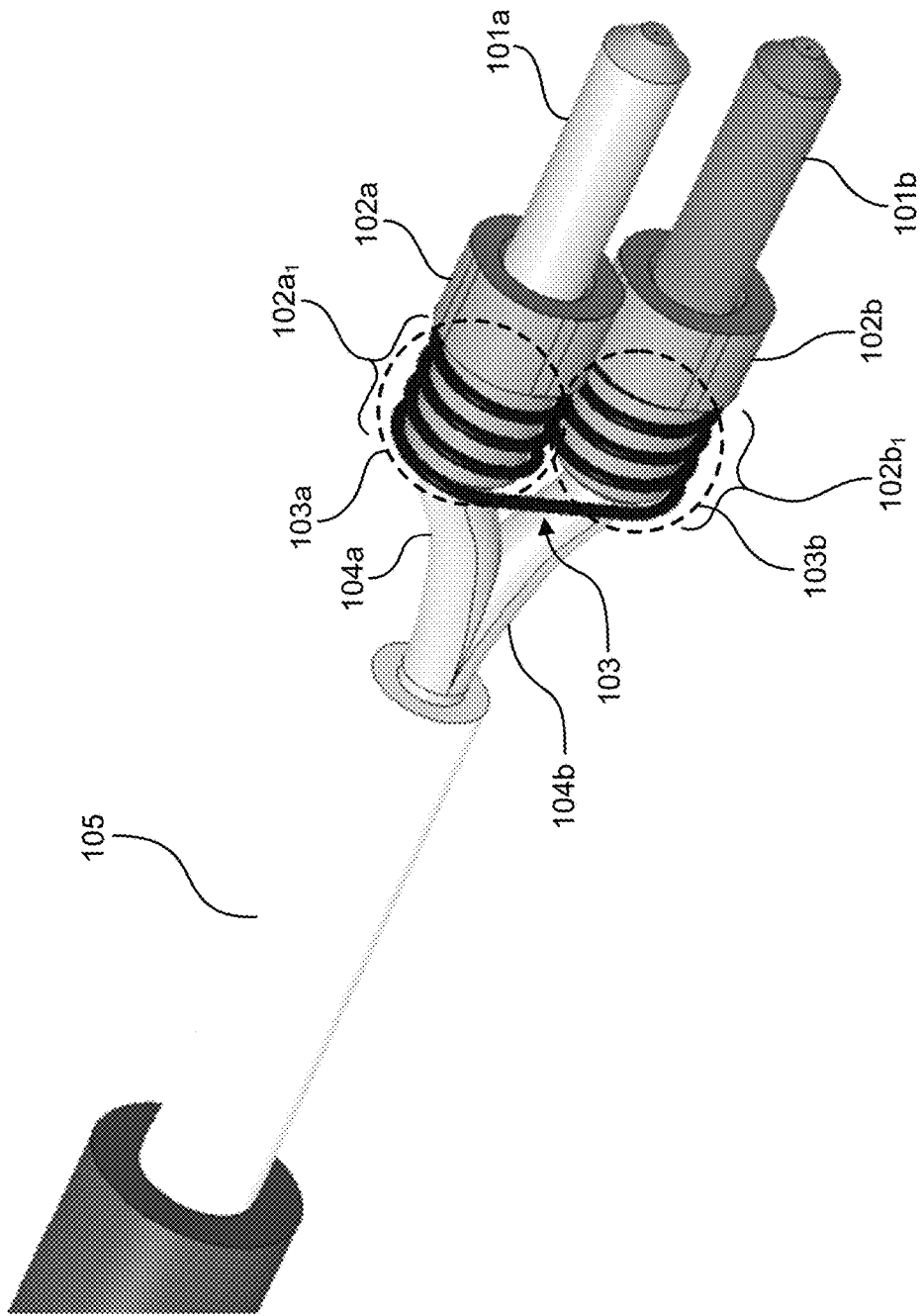
FIG. 1A illustrates an example duplex ferrule in accordance with embodiments of the technology disclosed herein.

The figures are not exhaustive and do not limit the present disclosure to the precise form disclosed.

DETAILED DESCRIPTION

The fiber core concentricity tolerances within fiber cladding buffer layers of early optical fibers were not tight enough to ensure effective coupling. Active alignment of each mated fiber core pair required rotation of the fibers to align each fiber end face, and then fixing the fibers in position. To prevent damage caused by rotation, an air gap between the fiber core ends was relied upon to minimize scratches on the ends of the fibers. This air gap resulted in reflection and deflection of light rays due to the change in refractive index from the glass fiber cores to the air in the air gap, resulting in optical power losses.

Optical fiber connectors used today are generally physical contact connectors. For modern simplex ferrules, fiber core concentricity tolerance is tight enough that various types of end faces are achieved by being polished (e.g., flat, dome, comb, step, angle) for different application needs. Keying features are implemented in duplex fibers for transmit and receive polarities when connecting between optical transceivers. All of these simplex ferrules are known as "physical contact" type, since the fiber end faces are physically contacted to eliminate air gap. A large mating force is applied to the fiber ferrules within modern connectors to slightly deform the end faces of each fiber core together to create a tight and planar mating connection. Eliminating the air gap reduced optical loss and back reflection by reducing the impact of changes in refractive indexes from one fiber end to the other.

However, the greater efficiency of physical contact connectors require a large mating force to be applied to each optical ferrule to ensure that the fiber cores are sufficiently pushed together. Each individual simplex ferrule (in a duplex ferrule connector) generally requires its own spring component to provide sufficient mating force, e.g., 5N-6N, increasing the overall size of each ferrule assembly and limiting the number of ferrules that can be mated within a connector. Moreover, precision alignment is required to ensure that, when mated together, the two fiber core ends are properly aligned for optical coupling. This results in a need to polish the end faces of the ferrules to ensure physical contact of the fiber end faces when mated. Polishing the end face of ferrules increases the cost associated with connector assembly. Accordingly, single fiber connectors (e.g., LC connectors) require relatively larger housings that limit the overall fiber density possible within a system. It is not easy to scale systems relying on simplex ferrules for configuration wherein greater than two fiber cores (i.e., duplex ferrule connectors) are maintained within a single connector housing. Each connector housing requires a corresponding receptacle in a faceplate or blindmate connector, resulting in an issue of real estate on a faceplate within a rack for making these types of connection.

Parallel fiber connectors allow for higher density fiber configurations than simplex or duplex ferrules by allowing a greater number of fibers to be connected through a single connector. Moreover, parallel fiber connectors provide greater flexibility and modularity in ordering fiber connections compared with duplex ferrules. Traditional parallel fiber ferrules (e.g., MT) in connector housings (e.g., MPO/MTP) also generally rely upon physical contact between the fiber cores. The increased number of fibers in parallel fiber ferrules, however, increases the overall mating force required to connect all of the fiber ends across the length of the connector. Further, high precision manufacture is necessary to achieve the low-loss connectivity of parallel fiber ferrules because of the larger number of fiber cores that need to be aligned to be optically coupled. Low-loss parallel fiber ferrules are available at higher cost. However, lower-loss physical contact type parallel fiber ferrules do not address the mating force issue, which increases the chance of either improperly mated ferrules or impractical to implement within standard optical connector housings. Nor do these low-loss parallel fiber ferrules minimize the extra cost associated with routing the duplex pairs across multiple parallel fiber connectors (e.g., the paired transmit/receive fibers for a single node-to-node connection), generally requiring expensive and complex breakout boxes or fiber shuffles.

Embodiments of the present disclosure are directed towards optical ferrule adapters and ferrule carriers enabling customizable optical connectivity (e.g., all-to-all, pseudo all-to-all, etc.) in a cost effective manner. As discussed in greater detail below, embodiments in accordance with the technology disclosed herein alleviate the scaling issues associated connectors relying on simplex ferrules (e.g., LC connectors) by enabling a parallel fiber connector-style organization of simplex ferrules within a ferrule carrier. Each ferrule carrier is designed to maintain a plurality of duplex ferrules (comprising a pair of transmit/receive fiber cores of an optical fiber) in a higher-density fiber configuration, similar to modern parallel fiber connectors. Moreover, the ferrule carriers enable more flexible duplex ferrule organization within each carrier. These duplex ferrules may come from different ends, e.g., different parallel fiber ferrules, in a way enabling a configurable/reconfigurable fiber shuffle half. A number of such ferrule carriers can be ganged together to form a ribbon-like connector, each ferrule carrier being independently floated within the gang such that the mating force on each ferrule when the gang is inserted into a corresponding adapter is lessened, reducing the overall length upon which the mating force need be applied. For the purposes of the present disclosure, to "gang" ferrule carriers together is to connect a plurality of ferrule carriers together through the use of a common bracket system, enabling the ferrule carriers to be handled, and resulting in a sequence of duplex ferrules in the ganged assembly, similar to a single parallel ferrule carrier. Ganging the ferrule carriers together extends the ability to order duplex ferrules across a number of different carriers, allowing ordered ferrules to be scalable. The adapter system can further reduce mating force by disposing a functional optical device within each mating sleeve, in between corresponding fiber core ends. The specific optical communication configuration can be customized based on the type of functional optical device disposed within the mating sleeves, the functional optical device being configured to optically couple the fiber cores without the need for physical contact. As will be appreciated by a person of ordinary skill in the art in view of the present disclosure, the technology discussed herein provides a cost effective, customizable system for optical communication having low-loss optical coupling without the need for expensive fiber shuffles or application of excessive mating force.

Figure 1B:
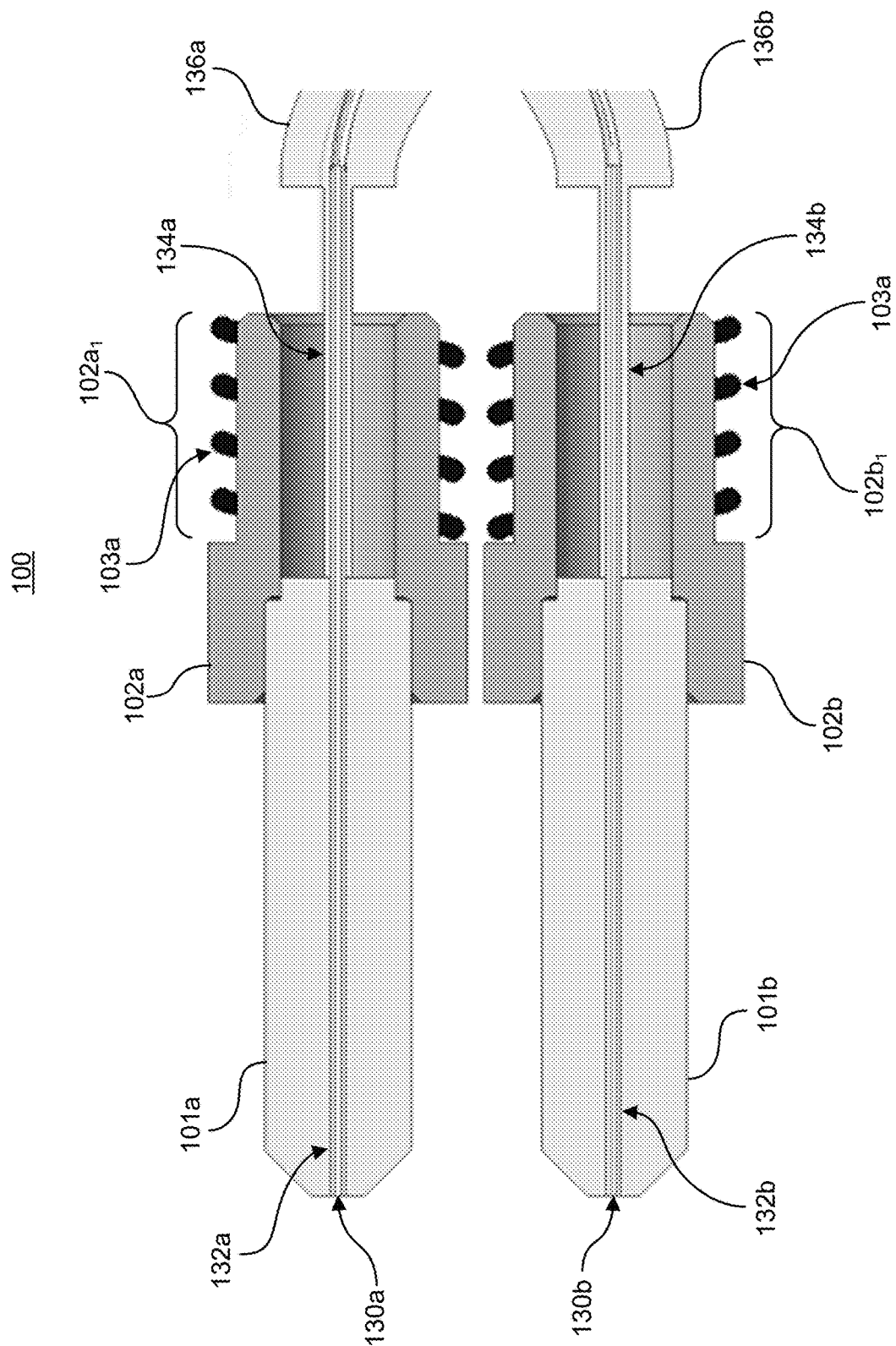
FIG. 1B is a cross-sectional view of the example duplex ferrule of FIG. 1A.

FIGS. 1A and 1B illustrates an example duplex ferrule 100 in accordance with embodiments of the technology disclosed herein. Duplex ferrule 100 is provided for illustrative purposes only and should not be interpreted as limiting the subject matter of the present disclosure. A person of ordinary skill in the art would understand that embodiments of the present disclosure are applicable with other duplex ferrule embodiments comprising similar components. As shown in FIG. 1A, example duplex ferrule 100 comprises a pair of simplex ferrules, a transmit ferrule 101a and a receive ferrule 101b. In various embodiments, transmit ferrule 101a and receive ferrule 101b can be constructed of the same material. Each simplex ferrule 101a, 101b is configured to accept a fiber core from an optical fiber cable 105. In various embodiments, each simplex ferrule 101a, 101b can be configured to interface with a ferrule opening disposed on a proximal end of a simplex flange 102a, 102b, respectively. For purposes of this disclosure, the proximal end of simplex flanges 102a, 102b is considered the end of each simplex flange 102a, 102b closest to the connection end of simplex ferrules 101a, 101b, the distal end comprising the end of each simplex flange 102a, 102b closer to the optical fiber cable 105. Simplex flanges 102a, 102b are configured to secure each simplex ferrule 101a, 101b and assist in securing each simplex ferrule 101a, 101b within a corresponding mating sleeve discussed with respect to FIGS. 5A-10B.

In various embodiments, a spring 103 can interface with each simplex flange 102a, 102b. When duplex ferrule 100 is inserted into an associated connector or adapter (e.g., adapter 500 discussed with respect to FIGS. 5A-8), spring 103 can provide a coupling force to physically secure each simple ferrule 101a, 101b in position. As shown in FIG. 1A, spring 103 can comprise two spring sections 103a, 103b connected together to form a dual-sided spring component. Each spring section 103a, 103b can be configured to be disposed on a spring portion $102a_1$, $102b_1$ of each simplex flange 102a, 102b respectively. In some embodiments, each spring section 103a, 103b can comprise a separate spring component, unconnected to each other. Spring portion $102a_1$, $102b_1$ can be disposed on the exterior of a distal end of each simplex flange 102a, 102b, each spring portion $102a_1$, $102b_1$ having a ridge against which each spring section 103a, 103b can abut to apply the requisite spring force. In other words, each spring portion $102a_1$, $102b_1$ can comprise an indentation in the exterior of each simplex flange 102a, 102b, respectively, such that spring sections 103a, 103b are stopped from extending to the proximal end of simplex flanges 102a, 102b.

In various embodiments, optical fiber cable 105 can comprise two fiber strands 104a, 104b. A person of ordinary skill in the art would understand that each fiber strand 104a, 104b illustrated in FIG. 1A comprises a fiber core having high index of refraction, glass cladding (having lower index of refraction than the fiber core) surrounding the fiber core to confine light to the core enabling the fiber core to be the optical waveguide, to prevent crosstalk, and to protect the glass fiber, and a fiber buffer material used to protect the glass fiber cladding and fiber core from damage, but that the specific construction of the optical fiber cable does not impact the applicability of the technology disclosed herein. The various layers of each fiber strand 104a, 104b are shown in FIG. 1B. A fiber core 130a, 130b is surrounded by the cladding 132a, 132b. A fiber buffer 134a, 134b surrounds the cladding 132a, 132b. The outer layer is a fiber jacket 136a, 136b. Each fiber strand 104a, 104b is configured to enter the interior of simplex flange 102a, 102b, respectively, through the distal end of each simplex flange 102a, 102b. The construction of simplex ferrules 101a, 101b with respect to each fiber core can be performed in the manner common within the art for terminating fiber cores within simplex ferrules.

Figure 2A:
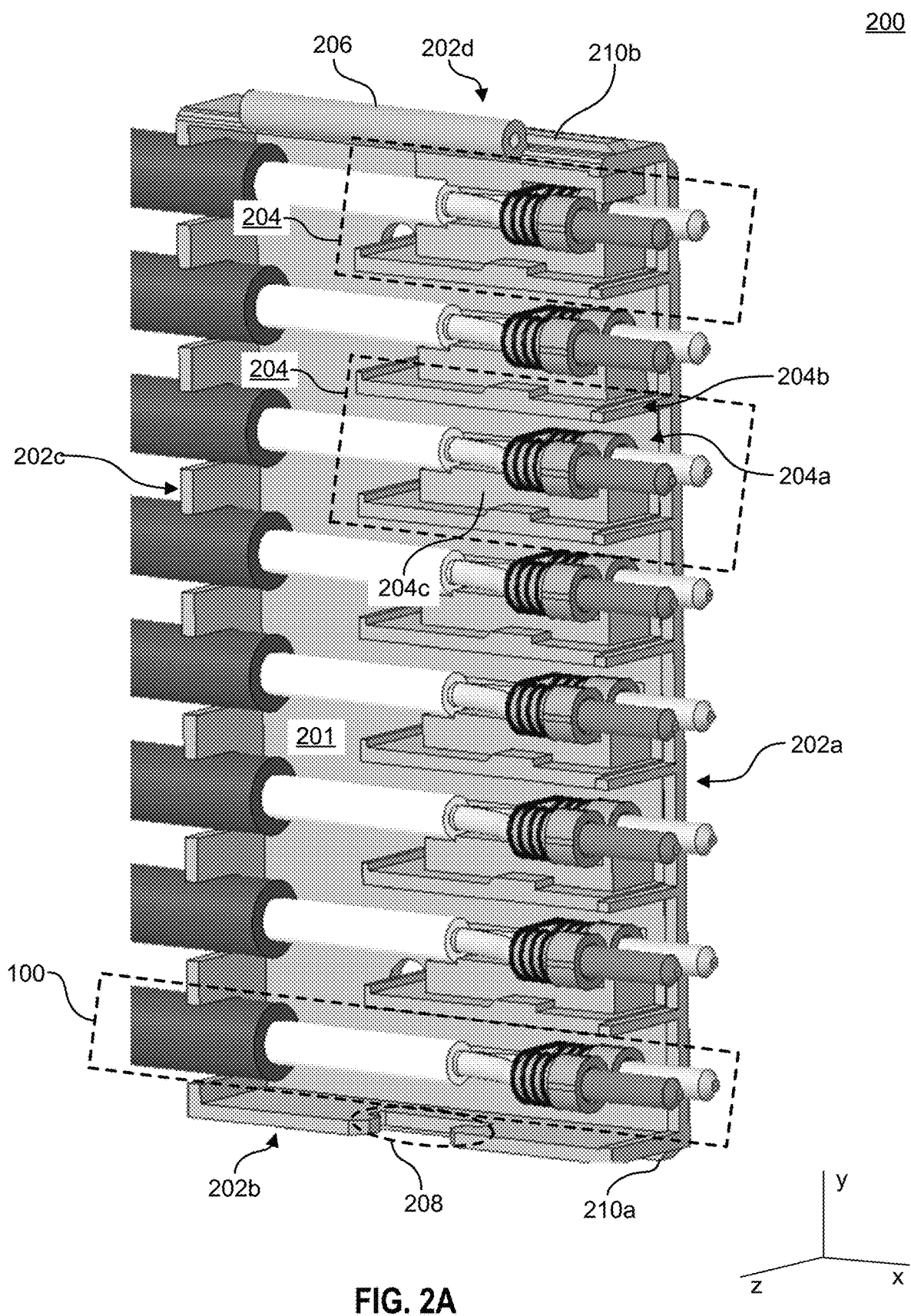
FIG. 2A illustrates an example ferrule carrier in accordance with embodiments of the technology disclosed herein.

As discussed above, embodiments of the present disclosure enable duplex ferrules, such as duplex ferrule 100, to be organized in a parallel fiber connector-style using a ferrule carrier. FIG. 2A shows an example ferrule carrier 200 in accordance with embodiments of the technology disclosed herein. Ferrule carrier 200 is provided for illustrative purposes only and should not be interpreted as limiting the scope of the present disclosure to only the specific form factor illustrated in FIG. 2A. For ease of discussion, ferrule carrier 200 is shown with the carrier lid not shown, to make it easier to see the interior components of ferrule carrier 200. As shown, ferrule carrier 200 comprises a carrier base 201 having four side walls 202a, 202b, 202c, 202d extending up from carrier base 201 (along the z-axis in FIG. 2A), forming an interior cavity of ferrule carrier 200. A plurality of duplex ferrule 100 are disposed within the interior of ferrule carrier 200, each duplex ferrule 100 being disposed within a ferrule bay 204. Ferrule bays 204 are configured to hold one duplex ferrule 100. In various embodiments, each ferrule bay 204 can comprise a bay opening 204a disposed in front wall 202a of carrier base 201. A plurality of separators 204b can extend upwards from base 201 (extend along the z-axis in FIG. 2A) to separate each ferrule bay 204. In various embodiments, two separators 204b can define the interior of each ferrule bay 204, while side walls 202b, 202d can serve to define the interior of ferrule bays 204 disposed next to each side wall 202b, 202d, respectively.

In various embodiments, one or more separators 204b may extend upward (along the z-axis in FIG. 2A) from carrier base 201 to a height equal to the height of side walls 202a, 202b, 202c, 202d. In other embodiments, one or more separators may extent to a height less than the height of side walls 202a, 202b, 202c, 202d. As a non-limiting example, one or more separators 204b may extend to a height above carrier base 201 that is equal to half the height of side walls 202a, 202b, 202c, 202d while in another non-limiting example, one or more separators 204b may extend to a height above carrier base 201 between 25%-75% of the height of side walls 202a, 202b, 202c, 202d. As illustrated in FIG. 2A, one or more separators 204b may extend from front wall 202a to a position less than the width of carrier base 201. In other embodiments, one or more separators 204b may extend the width of carrier base 201, from front wall 202a to back wall 202c.

Each duplex ferrule 100 can be secured within each ferrule bay 204 by a ferrule retainment feature 204c. In the illustrated embodiment, ferrule retainment feature 204c is illustrated as being disposed within the interior of ferrule bay 204, along one separator 204b. In various embodiments, ferrule retainment feature 204c can be used to configure that each ferrule carrier 200 in a serial configuration or a parallel configuration. FIGS. 2B and 2C show an example "parallel configuration" ferrule carrier 200P and an example "serial configuration" ferrule carrier 200S in accordance with embodiments of the technology disclosed herein. As shown in FIG. 2B, parallel configuration ferrule carrier 200P includes all of the duplex ferrules 100 arranged in a parallel manner (i.e., the ferrules are arranged such that the polarity of all the simplex ferrules within a column along axis YY are the same). In the illustrated embodiment of FIG. 2B, a parallel arrangement means that all the ferrules to the left of axis YY are transmit simplex ferrules, and all the simplex ferrules to the right of axis YY are receive simplex ferrules. As shown in FIG. 2C, serial configuration ferrule carrier 200S includes all of the duplex ferrules 100 arranged in a serial manner (i.e., all of the simplex ferrules are arranged in a straight line along axis XX). When configured in this way, the polarity of each simplex ferrule alternates along the length of axis XX (e.g., a transmit simplex ferrule, a receive simplex ferrule, a transmit simplex ferrule, etc.).

Referring back to FIG. 2A, in various embodiments, ferrule retainment feature 204c can be configured to secure a duplex ferrule 100 in either the serial configuration or the parallel configuration. Such ferrule retainment features 204c can be permanently affixed to ferrule carrier 200 in various embodiments, permanently setting the nature of ferrule carrier 200 (i.e., as a parallel configuration ferrule carrier 200P or a serial configuration ferrule carrier 200B). In other embodiments, ferrule retainment feature 204c may be removably affixed to ferrule carrier 200, enabling ferrule carrier 200 to be customizable into either the serial configuration or the parallel configuration depending on the implementation. In some embodiments, a parallel configuration ferrule carrier 200P and a serial configuration ferrule carrier 200S may have the same physical size by using the same number of square-shaped duplex ferrules in different orientations, as shown in FIG. 2B and FIG. 2C. In other embodiments, different configurations may have different physical size ferrule carriers based on the shape and size of the ferrules in the carriers. As a non-limiting example, the ferrules could have a rectangular shape. When rectangular duplex ferrules are used, parallel configuration ferrule carrier 200P may have the same x-axis dimension but smaller y-axis dimension than shown in the illustrated embodiment of FIG. 2B. With respect to serial configuration ferrule carrier 200S of FIG. 2C, using rectangular duplex ferrules would result in serial configuration ferrule carrier 200S having a smaller y-axis dimension but the same y-axis dimension than shown in the illustrative embodiment. If rectangular-shaped ferrules are used then the length (i.e., Y-axis dimension) of parallel configuration ferrule carrier 200P may be smaller than the length (i.e., X-axis dimension) of serial configuration ferrule carrier 200S, and the thickness (i.e., X-axis dimension) of parallel configuration ferrule carrier 200P may be larger than the thickness (i.e., Y-axis dimension) of serial configuration ferrule carrier 200S, although both 200P and 200S have 1×8 configuration.

Although not shown in FIG. 2A, a carrier lid may be attached to carrier base 201. In one embodiment attachment may be by using screws. In another embodiment the attachment may be by a hinge 206. As illustrated, hinge 206 can be disposed on side wall 202d, allowing the carrier lid (not shown in FIG. 2A) to pivot from a closed position into an open position, and vice versa. In the closed position, the carrier lid would latch with latch socket 208 disposed on side wall 202b. A side rail 210a, 210b may be disposed on side walls 202b, 202d, respectively, to assist in installing ferrule carrier 200 within a ganged connector (discussed in greater detail below with respect to FIGS. 3A and 3B). As illustrated in FIG. 2A, each simplex ferrule 101a, 101b of duplex ferrule 100 extends out (along the x-axis) from each bay opening 204a.

Although shown as including eight ferrule bays 204 (and, accordingly, accommodating eight duplex ferrules 100), the illustrative embodiments of FIGS. 2A-2C should not be interpreted as limiting the scope of the present disclosure. In various embodiments, ferrule carrier 200 can be configured to accommodate fewer duplex ferrules 100, while in other embodiments ferrule carrier 200 may accommodate a greater number duplex ferrules 100. A person of ordinary skill in the art would understand that the applicability of the technology disclosed herein is not limited to a specific form factor.

Figure 3A:
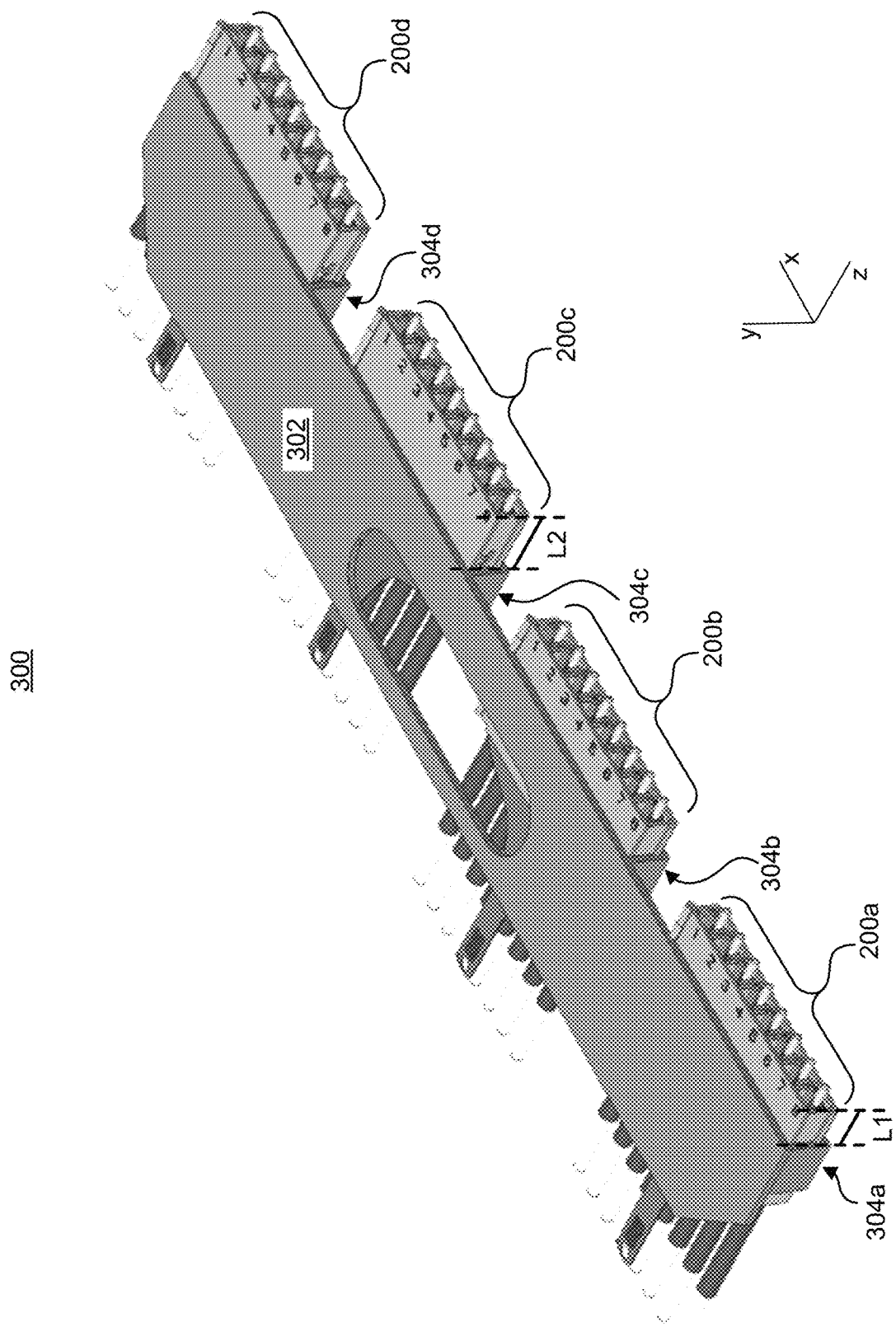
FIG. 3A is an example ganged optical connector in accordance with embodiments of the technology disclosed herein.
Figure 3B:
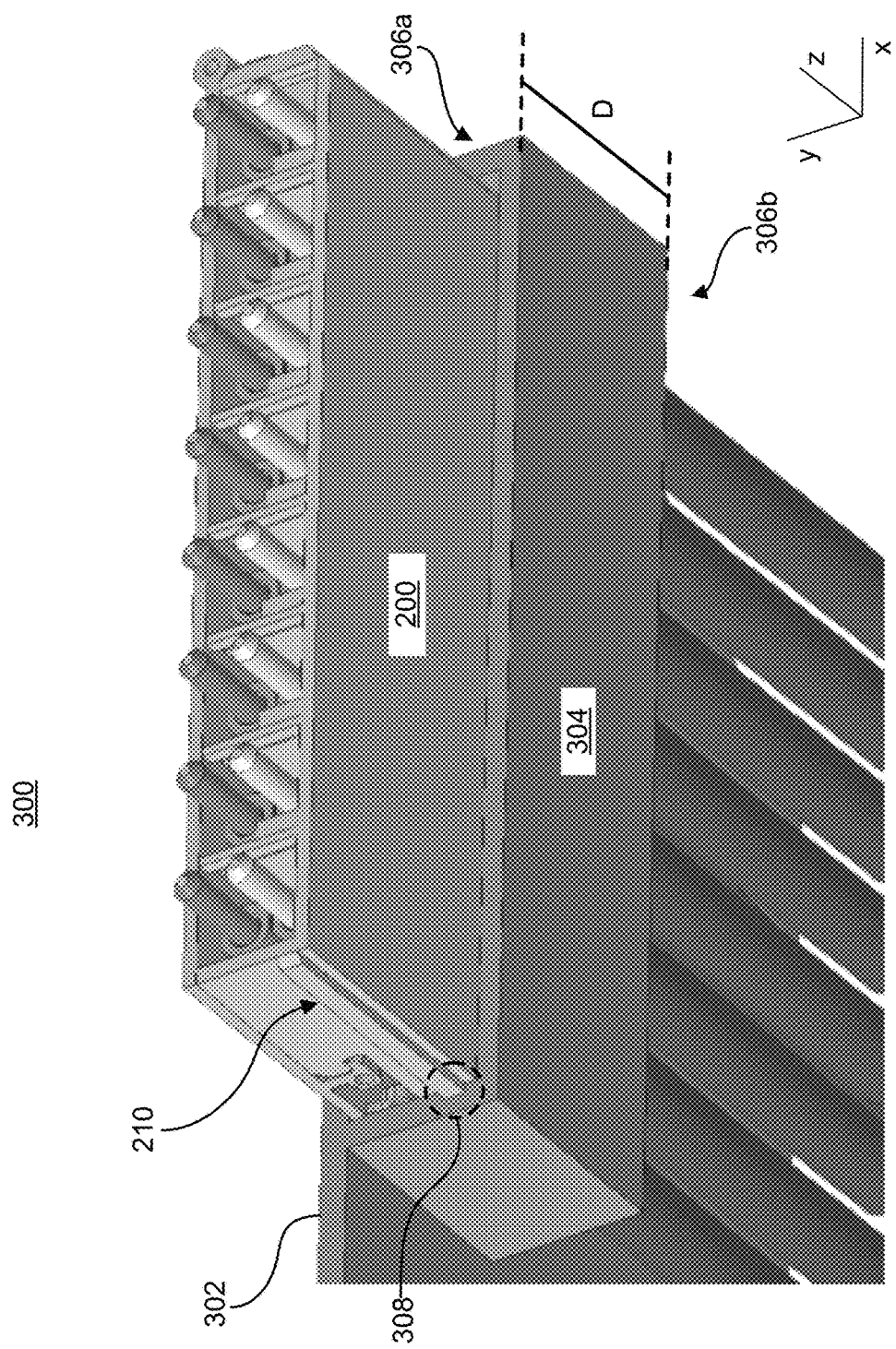
FIG. 3B illustrates an example carrier receptacle in accordance with embodiments of the technology disclosed herein.

In addition to enabling duplex ferrules 100 to be arranged in a parallel fiber connector-style (as shown in FIGS. 2A-2C), ferrule carriers 200 can also be grouped together to connect a number of fiber cables with an ordered sequence at the same time. FIGS. 3A and 3B illustrate an example optical connector 300 in accordance with embodiments of the present disclosure. As shown in FIG. 3A, the example optical connector 300 comprises a bracket 302 having four carrier receptacles 304a, 304b, 304c, 304d disposed on a bottom side of bracket 302. Although shown as a four-carrier configuration, this example optical connector 300 is provided for illustrative purposes only and should not be interpreted as limiting the scope of the technology to only 1×4 configurations. A person of ordinary skill in the art would understand that in other embodiments the optical connector 300 may include more or fewer carrier receptacles depending on the implementation. Each carrier receptacle 304a, 304b, 304c, 304d is configured to accept a ferrule carrier, such as ferrule carriers 200 discussed with respect to FIGS. 2A-2C, each ferrule carrier being independently floated (i.e., independently capable of moving along the z-axis in FIG. 3A) within optical connector 300. By allowing each ferrule carrier 200 to move independently of each other along the z-axis, the technology disclosed herein reduces the amount of force necessary to ensure that all ferrules within optical connector 300 are mated when inserted into an adapter system. Each ferrule carrier 200 is capable of being properly seated within its associated adapter even if other ferrule carriers 200 are not fully connected yet. In other words, the overall mating force required for optical connector 300 is spread out amongst the independently floated ferrule carriers 200, unlike modern parallel fiber connectors that require a larger mating force on all ferrules as the number of ferrule in the connector increases.

The independent floating capability of each ferrule carrier is illustrated by the different lengths L1, L2 of ferrule carriers 200a, 200c, respectively, extending outwards (i.e., along the z-axis in FIG. 3A) from carrier receptacles 304a, 304c. As shown, ferrule carrier 200a is positioned such that length L1 of ferrule carrier 200a is sitting outside of carrier receptacle 304a. Ferrule carrier 200c, on the other hand, is positioned such that length L2 of ferrule carrier 200c is sitting outside of carrier receptacle 304c. As can be seen, ferrule carrier 200a is further inserted into carrier receptacle 304a than ferrule carrier 200c is within carrier receptacle 304c, resulting in less of ferrule carrier 200a being exposed out of a first end of carrier receptacle 304a (i.e., adapter end 306a illustrated in FIG. 3B) than is exposed out of the first end of carrier receptacle 304c. During insertion of optical connector 300 into an adapter system (discussed with respect to FIGS. 5A-5D), each ferrule carrier 200a, 200b, 200c, 200d is free to move once contact is made with the corresponding adapter, reducing the potential mating force applied by relieving some of the force through allowance of the ferrule carrier to move backwards (along the z-axis of FIG. 3A or 3B).

FIG. 3B is an expanded view of an example carrier receptacle 304 of optical connector 300 in accordance with embodiments of the present disclosure. As with all figures in the present disclosure, where common references are used between figures it should be interpreted that the discussion of such references with respect to any one figure apply equally for all instances where the common reference is used, unless explicitly stated otherwise. Moreover, where multiple instances of the same element are illustrated (e.g., ferrule carriers 200a, 200b, 200c, 200d of FIG. 3A), discussion with respect to the general reference (i.e., ferrule carrier 200) should be presumed to apply equally to each instance unless otherwise stated. As shown in FIG. 3B, each carrier receptacle 304 can include a rail interface 308 disposed on an interior side of carrier receptacle 304. Rail interface 308 can be configured to accept a side rail 210 (i.e., rail 210a, 210b discussed with respect to FIG. 2A) of ferrule carrier 200. In various embodiments, carrier receptacle 304 can include more than one rail interface 308 disposed on opposite sides of the interior of carrier receptacle 304 and corresponding to at least one side rail 210 of ferrule carrier 200. Rail interface 308 and side rail 210 can cooperate to minimize motion of ferrule carrier 200 in the vertical direction (i.e., along the y-axis in FIG. 3B) and enable ferrule carrier 200 to move along the z-axis. As shown in FIG. 3B, each carrier receptacle 304 can have a depth D. In various embodiments, depth D may be equal to a depth of bracket 302, while in other embodiments depth D may be less than the depth of bracket 302 (as illustrated in FIG. 3B). In various embodiments, side rails 210 can be configured to secure ferrule carrier 200 in ferrule receptacle 304, similar to the bracket connection features discussed with respect to FIGS. 4A-4F below.

Each ferrule carrier 200 can be inserted into a carrier receptacle 304 through a cable side opening 306b of carrier receptacle 304, with the side of ferrule carrier 200 with the simplex ferrules extending out from the adapter side 306a of carrier receptacle 304. In some embodiments, carrier receptacle 300 may be permanently affixed to bracket 302 (as shown in FIG. 3B), while in other embodiments carrier receptacle 304 may be removably affixed to bracket 302. In such embodiments, carrier receptacle 304 may be hingeably attached to bracket 302, enabling carrier receptacle 304 to be moved into an open position for insertion of a ferrule carrier 200, which can then be secured by moving carrier receptacle 304 into the closed position. Such embodiments may make insertion of the ferrule carriers easier.

Figure 4A:
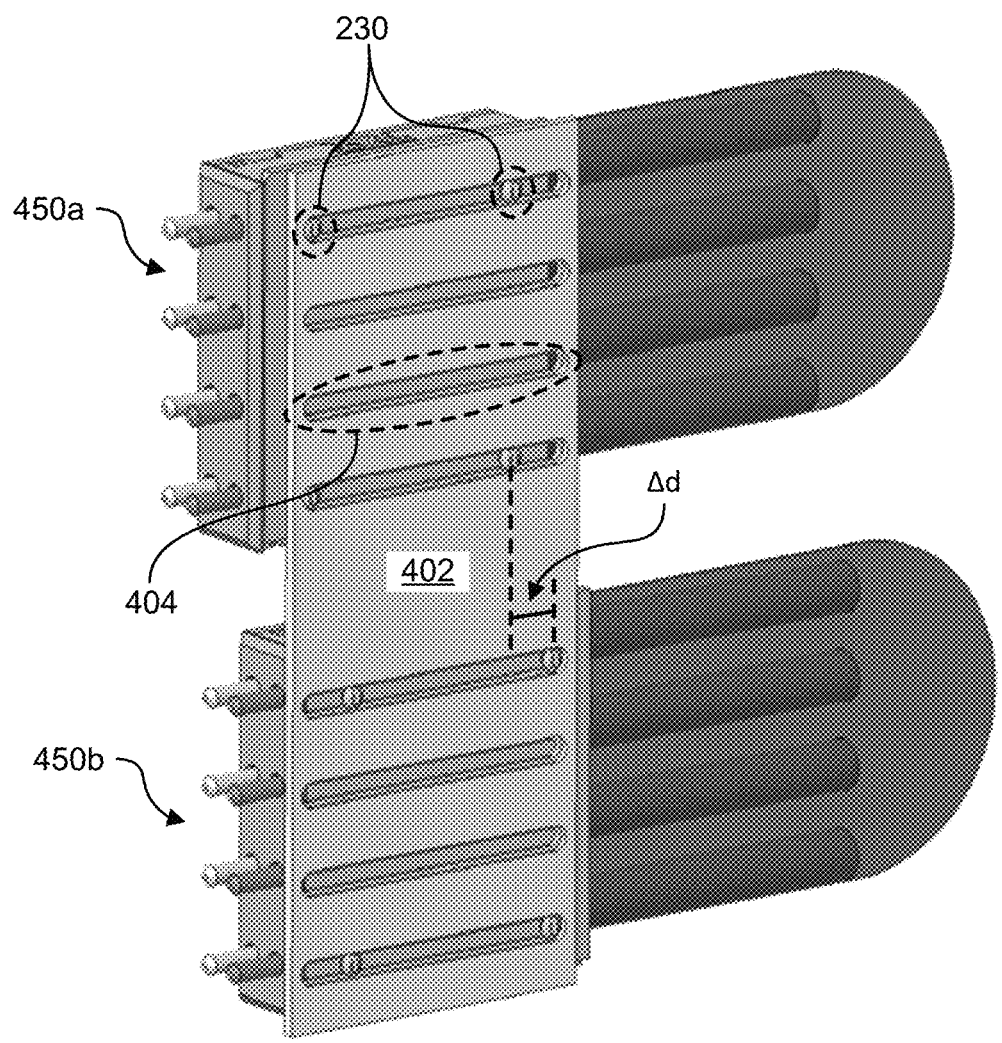
FIG. 4A shows another example ganged optical connector in accordance with embodiments of the technology disclosed herein.
Figure 4B:
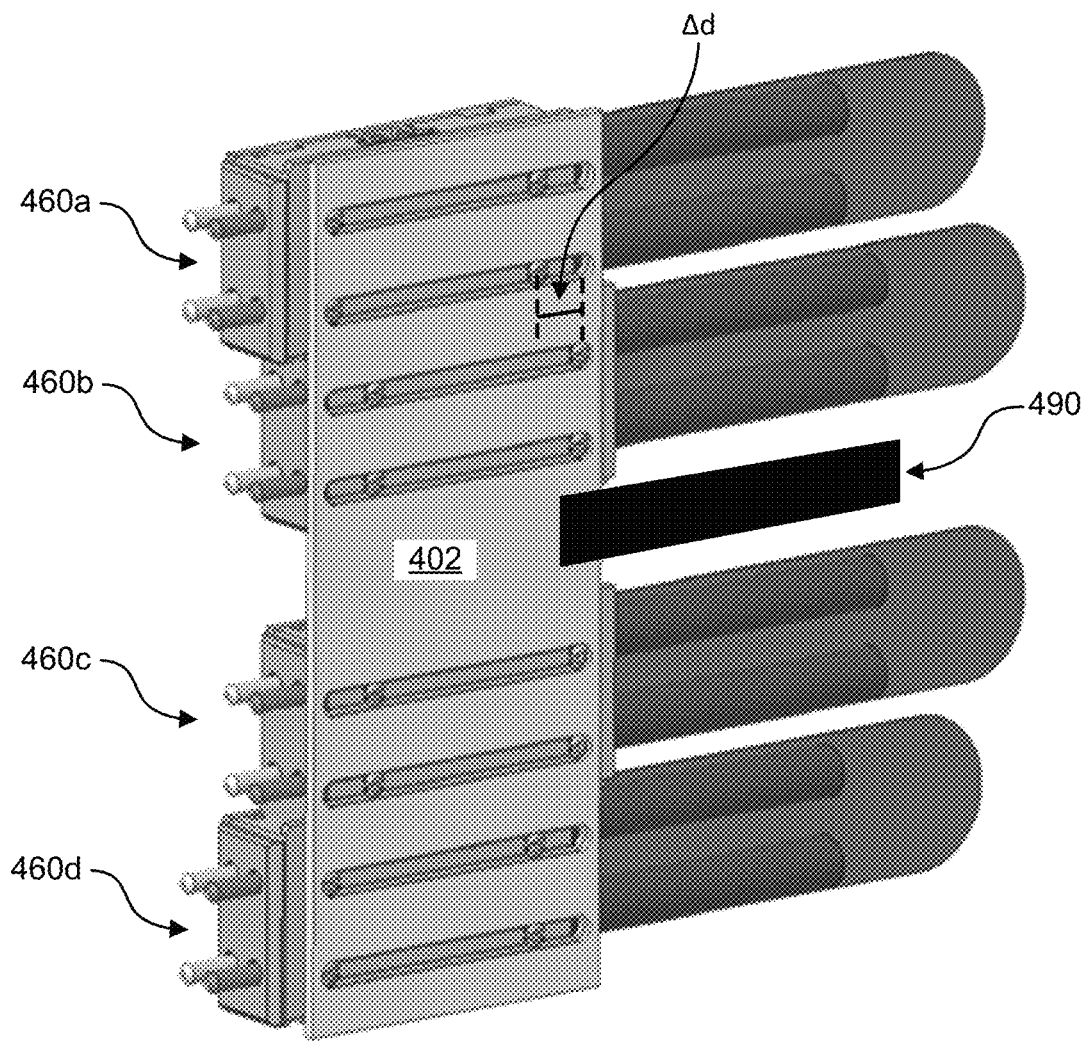
FIG. 4B shows another example ganged optical connector in accordance with embodiments of the technology disclosed herein.
Figure 4C:
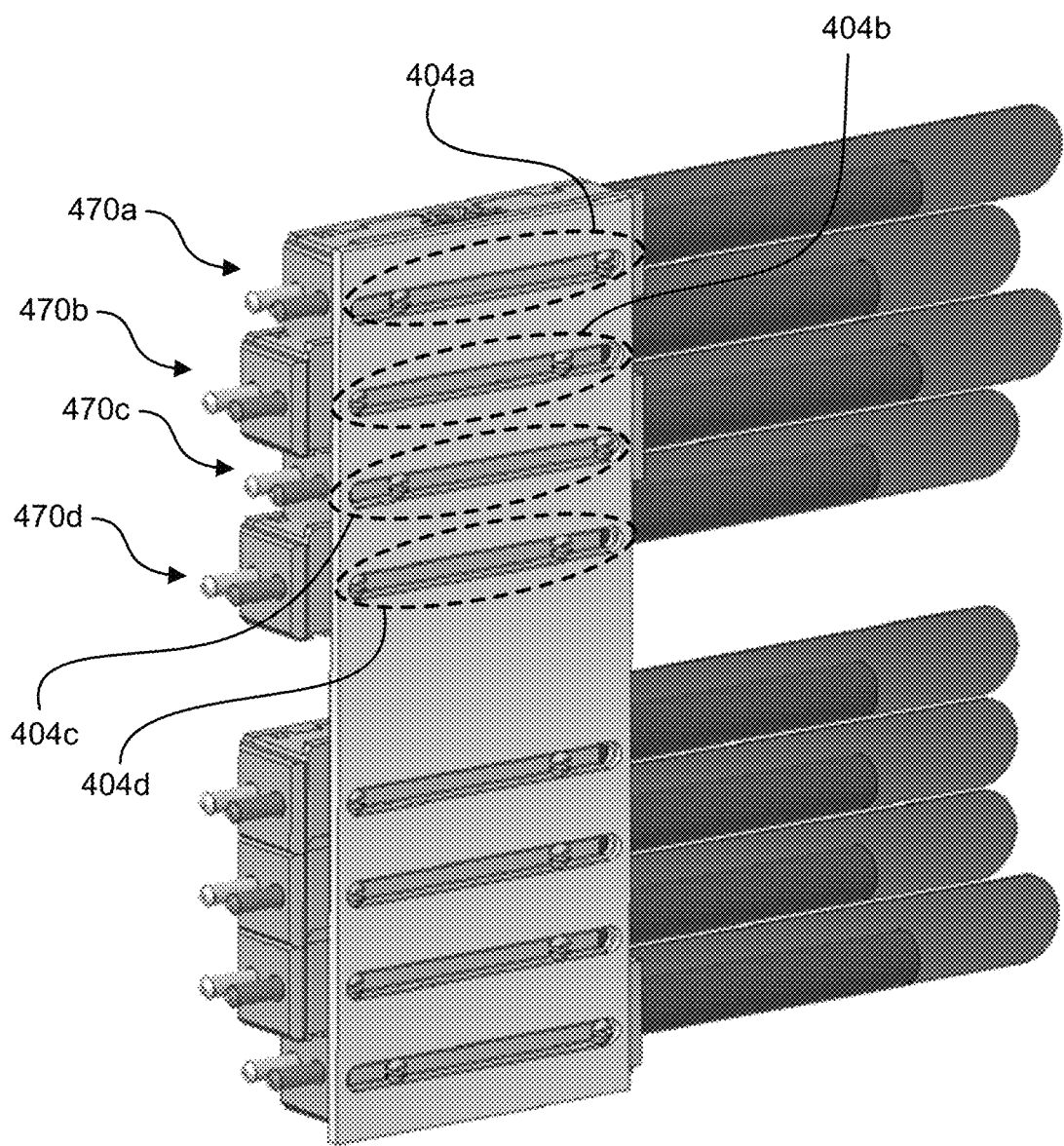
FIG. 4C shows another example ganged optical connector in accordance with embodiments of the technology disclosed herein.

The example optical connector 300 is provided for illustrative purposes only. In other embodiments, ferrule carriers may be combined together utilizing other bracket embodiments. FIGS. 4A-4F illustrates a variety of different embodiments of optical connectors in accordance with embodiments of the technology disclosed herein. FIG. 4A-4C illustrate example ganged optical connectors 410A-410C in accordance with the technology disclosed herein. As shown in FIG. 4A, ganged optical connector 410A comprises a gang bracket 402 including a plurality of channels 404. As illustrated, ganged optical connector 410A is illustrated with carriers having four duplex ferrules (such as duplex ferrules 100 discussed above with respect to FIG. 1). Although discussed with respect to a quad-duplex ferrule carriers 450a, 450b for ease of discussion, nothing in this present disclosure should be interpreted as limiting ganged optical connector 410A to use with only carriers maintaining four duplex ferrules. As would be understood by a person of ordinary skill in the art, different form factor ferrule carriers can be used within ganged optical connector 410A. As a non-limiting example, ganged optical connector 410A can be used with carriers having a greater number of ferrules contained therein, such as ferrule carrier 200 discussed with respect to FIGS. 2A-2C.

Unlike example optical connector 300 discussed with respect to FIGS. 3A and 3B, ganged optical connector 410A does not include individual ferrule carrier receptacles 304. Instead, each quad-duplex ferrule carrier 450a, 450b is connected to gang bracket 402 via channels 404, each quad-duplex ferrule carrier 450a, 450b comprising one or more bracket connection features 230 disposed on an exterior side of the carrier base (e.g., carrier base 201 discussed with respect to FIG. 2A) of the carrier lid (not pictured in FIG. 2A). In various embodiments bracket connection features 230 are designed to provide the floating motion along the z-axis provided by side rails 210 and rail interface 308 discussed with respect to FIGS. 2A and 3B. In some embodiments, bracket connection features 230 can be permanently affixed to the exterior side of the carrier base or carrier lid and one or more channels 404 can be configured to mate with bracket connection features 230 and securely hold quad-duplex ferrule carriers 450a, 450b to gang bracket 402. As shown in FIG. 4A, each ferrule carrier 450a, 450b can move independently of each other along the length of channels 404 (along the z-axis). In the illustrated example of FIG. 4A, the difference in distance Δd between the bracket connection feature 230 of ferrule carrier 450a and the bracket connection feature 230 of ferrule carrier 450b show that each ferrule carrier 450a, 450b is free to move independently of the other.

As a non-limiting example, channels 404 can comprise keyhole slots having one or more wide areas configured to accept a bracket connection feature 230 protruding out from the exterior of the carrier base or carrier lid (along the x-axis in FIG. 4A) and the remainder of each channel 404 being narrower than the width of the bracket connection feature 230 within the channel. During installation of each ferrule carrier 450a, 450b, bracket connection features 230 may enter into a corresponding wide area of a channel 404. After being inserted, ferrule carriers 450a, 450b can be moved into an initial position wherein bracket connection features 230 are moved onto a narrow portion of channel 404. In various embodiments, the initial position may be configured such that each ferrule carrier 450a, 450b is capable of a moving freely along the z-axis without bracket connection features 230 reaching the wide areas of channels 404 and disconnecting from gang bracket 402. In other embodiments, bracket connection feature 230 can comprise a threaded aperture configured to accept a screw or other similar securing hardware. In such embodiments, a screw or other securing hardware can be inserted into bracket connection feature 230 through channel 404, securing ferrule carrier 450a, 450b to gang bracket 404. In such embodiments, channels 404 can have the same width along the entire length of the channel.

As discussed above, modern parallel fiber connectors enable higher fiber density than the use of connectors utilizing simplex ferrules (either single simplex ferrules or duplex-style connectors). However, parallel fiber connectors are fixed on the fibers, increasing the mating force as more fibers are added to the parallel fiber connector. The example optical connectors 300, 410A discussed so far allow for controlling the mating force on the duplex ferrules arranged in a parallel fiber connector-style by grouping ferrule carriers together, while allowing each carrier to float independently of each other (i.e., move in the z-direction independently). In various embodiments, it may be beneficial to control the mating force not only between ferrule carriers, but amongst the duplex ferrules. FIG. 4B illustrates another example ganged bracket connect 410B in accordance with embodiments of the present disclosure. Where common references are used to describe elements of a given figure that description should be interpreted to apply to all elements referred to using the common reference unless explicitly stated otherwise.

As shown, instead of two ferrule carriers (like ferrule carriers 450a, 450b discussed above with respect to FIG. 4A), two carriers configured to hold two duplex ferrules (e.g., dual-duplex ferrule carriers 460a, 460b) are combined into a subgroup of ferrule carriers. Dual-duplex ferrule carriers 460a, 460b comprise a first subgroup of ferrule carriers while ferrule carriers 460c, 460d comprise a second subgroup. In various embodiments, each subgroup of ferrule carriers are associated with a given adapter (discussed in detail below with respect to FIGS. 5A-5D and 6) such that, when ganged optical connector 40B is inserted into the adapter, each subgroup would constitute a row or column of the adapter. Each dual-duplex ferrule carrier 460a, 460b, 460c, 460d are similar to the ferrule carriers discussed with respect to FIGS. 1, 2A-2C, 3A-3B, and 4A, only having a different number of duplex ferrules included. As shown in FIG. 4B, rather than all of the duplex ferrules within a subgroup moving as one (as shown in FIG. 4A), the configuration in FIG. 4B enables even more control over the mating force by further dividing the number of fiber cores that need to be connected as one (i.e., reducing the number of fiber cores fixed within a connector). A smaller number of duplex ferrules are now free to move along the z-axis independently of the rest of the duplex ferrules in that row or column of the adapter. In some embodiments, dual-duplex ferrule carriers 460a, 460b, 460c, 406d can include one or more guide features (not shown in FIG. 4B) disposed on one or more ends of ferrule carrier 460a, 460b, 460c, 460d. These guide features can be similar to side rail 210 and rail interface 308 discussed above with respect to FIGS. 2A, 3A, and 3B, and serve to facilitate the independent floating of each ferrule carrier for independent z-axis motion.

FIG. 4C shows another example ganged optical connector 410C that provides even more independence between in accordance with embodiments of the technology disclosed herein. As shown in FIG. 2C, four single-duplex ferrule carriers 470a, 470b, 470c, 470d comprise a subgroup of ferrule carriers, similar to the ferrule carriers 450a, 450b discussed with respect to FIG. 4B. Each single-duplex ferrule carrier 470a, 470b, 470c, 470d has a corresponding channel 404a, 404b, 404c, 404d associated with it, configured to accept the one or more bracket connection features of each ferrule carrier 470a, 470b, 470c, 470d. Accordingly, each ferrule carrier 470 is capable of moving independently of every other ferrule carrier in its subgroup, and each subgroup can move independently of another subgroup.

Optical connectors, such as the examples shown in and discussed with respect to FIGS. 3A-3B and 4A-4C provide a single bracket (bracket 302, ganged bracket 402) to which all of the ferrule carriers are attached in a set configuration. This provides a steady, rigid structure to hold the ferrule carriers in a specified sequence, enabling parallel connector-type organization of duplex ferrules. Utilizing a single bracket enables carrier receptacles (like carrier receptacles 404 of FIGS. 3A and 3B) easier to connect a large number of optical fibers in a given order at the same time. In various embodiments, bracket 302 or gang bracket 402 can be configured to hold more than the two or four ferrules carriers depicted in FIGS. 3A and 4A-4C, making it easier to scale. Different levels of mating forces are possible based on the specific density of the ferrule carriers. The specific density of each ferrule carrier refers to the number of duplex ferrules that it is configured to hold, while overall fiber density refers to the total number of duplex ferrules (across a plurality of ferrule carriers) within a system.

Although using brackets like those discussed with respect to FIGS. 3A-3B and 4A-4C helps increase scalability and flexibility in the system, scaling requires adding additional ferrule carriers to the bracket, which necessitates elongating the bracket 302, 402, resulting in the need to create a new bracket and also increasing the size. The configuration of ferrule carriers within each bracket 302 and ganged bracket 402 is also set, meaning that the same bracket could not be reconfigured to accommodate a change in the spacing of ferrule carriers within the system. In various embodiments, bracket 302 and gang bracket 402 can be made of a flexible material to make it easier to connect, but the potential size may go beyond the effective size for such materials.

Figure 4D:
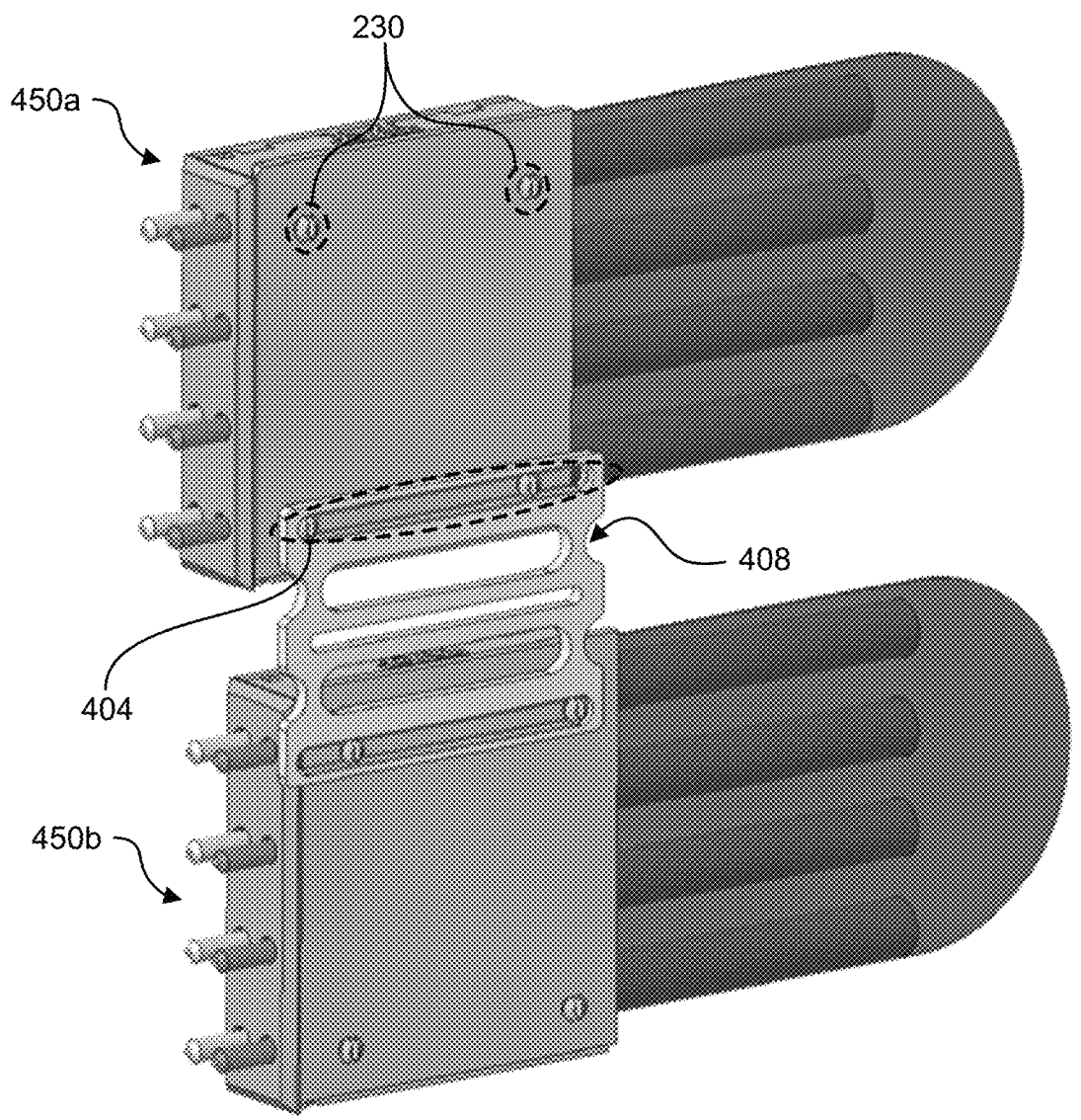
FIG. 4D shows an example linked optical connector in accordance with embodiments of the technology disclosed herein.
Figure 4D:
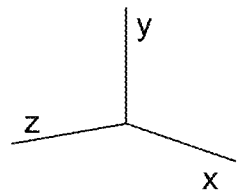
Figure 4E:
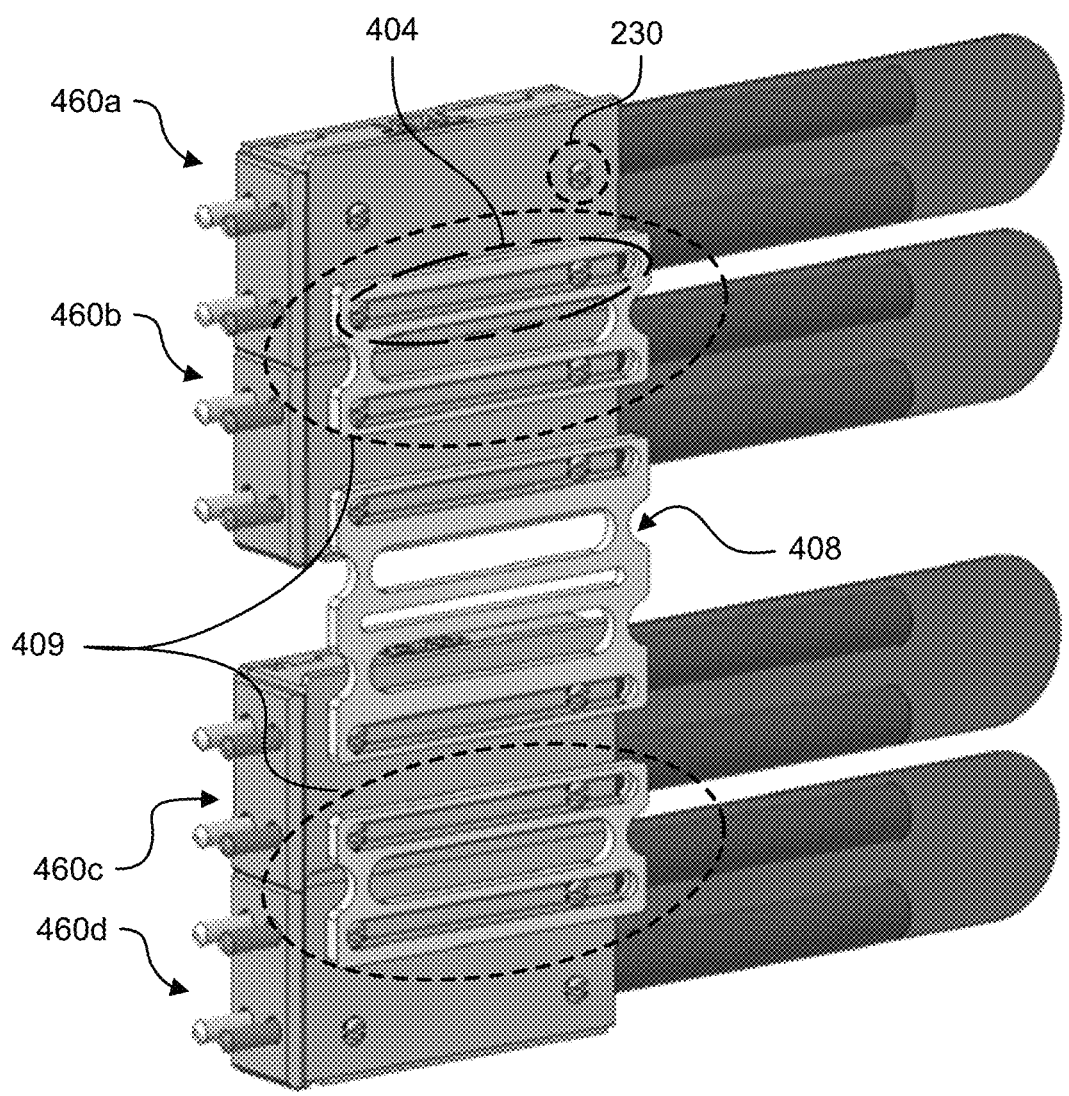
FIG. 4E shows another example linked optical connector in accordance with embodiments of the technology disclosed herein.
Figure 4F:
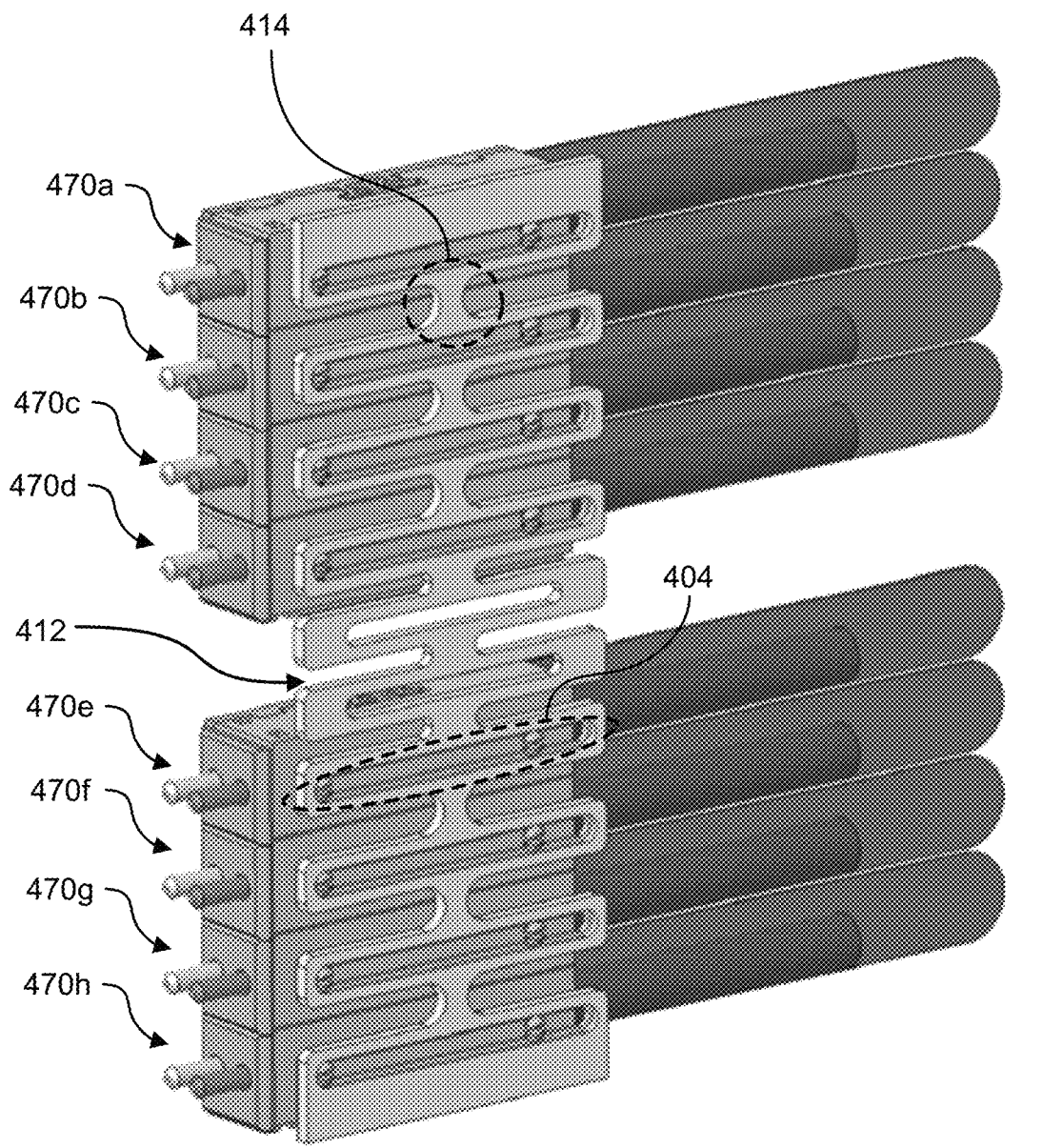
FIG. 4F shows another example linked optical connector in accordance with embodiments of the technology disclosed herein.

In various embodiments, rather than ganging ferrule carriers onto a single bracket having a set configuration of ferrule carriers, several brackets can be used in combination to perform the same functionality and providing greater flexibility. Although optical connectors 410A-410C having ganged bracket 402 are less scalable, the set location of ferrule carriers allows for a more stable bracket for independent motion of each ferrule carrier for mating and demating. In various embodiments, ganged bracket 402 can have a handle 490 extending backwards (i.e., away from the ferrules) on the z-axis, as illustrated in FIG. 4B. Handle 490 can be configured to provide a structure for a person to securely handle ganged bracket 402. In various embodiments, handle 490 can be disposed above the ferrule carriers, while in other embodiments handle 490 may be disposed on the ganged bracket 402 in the position above or below the ferrule carriers. FIGS. 4D-4F show example linked optical connectors 420A-420C in accordance with embodiments of the technology disclosed herein. Unlike the example optical connectors 300, 410A-410C, linked optical connector 420A comprises a link bracket 408 to affix ferrule carriers 450a, 450b together, creating a linked optical connector 420A. Unlike gang bracket 402 discussed with respect to FIGS. 4A-4C, link bracket 408 does not extend the entire length of the system connection (i.e., a long run of multiple ferrule carriers groups together in a 1×N configuration) but instead is dimensioned to connect with bracket connection features 230 of the corresponding ferrule carriers 450a, 450b. Link bracket 408 can be connected to ferrule carriers 450a, 450b in the same manner as described above with respect to gang bracket 402 in FIGS. 4A-4C. Link bracket 408 can be configured to maintain the required distance between ferrule carriers 450a, 450b. Utilizing link brackets 408 allows for more physical flexibility and easier scaling because, rather than need to create a new gang bracket if you want to add another adapter to the system, another link bracket 408 can be used to connect the new ferrule carrier to the group.

FIG. 4E illustrates additional examples of linked optical connectors 420B, in accordance with embodiments of the present disclosure. As shown in FIG. 4E, linked optical connector 420B can be used to connect ferrule carriers into subgroups having their own degree of independent float. In the illustrated embodiment, link bracket 408 is used to connect an end ferrule carrier 460b, 460c of each respective subgroup. Within each subgroup of ferrule carriers, a subgroup bracket 409 is used to connect adjacent ferrule carriers within the subgroup. Subgroup bracket 409 also includes channels 404 to connect with corresponding bracket connection features 230 disposed on adjacent ferrule carriers 460a, 460b or 460c, 460d within the subgroup, respectively. Subgroup bracket 409 can have a smaller width than link bracket 408 because subgroup bracket 409 is designed to connect adjacent ferrule carriers within a subgroup, instead of connecting two separate groups of ferrule carriers. Link bracket 408 maintains a gap between the subgroups of ferrule carriers to ensure each subgroup of ferrules is properly inserted into the right column or row of the adapter. In some embodiments, link bracket 408 and subgroup bracket 409 may each have a handle similar to handle 490 discussed with respect to FIG. 4B.

FIG. 4F shows an example linked optical connector 420C for connecting a plurality of single-duplex ferrule carriers 470a-470h within subgroups in accordance with embodiments of the present disclosure. Unlike the example linked optical connectors 420A and 420B, linked optical connector 420C is not separate brackets but is a single bracket similar to bracket 302 and ganged bracket 402. The slotted bracket 412 has a plurality of channels 404 disposed equally across the length of slotted bracket 412. In this way, the location of ferrule carriers (or subgroups of ferrule carriers) is customizable, enabling linked optical connector 420C to be used in a variety of implementations without the need to create new brackets. In various embodiments, one or more joints 414 of slotted bracket 412 can be configured to detach, enabling slotted bracket 412 to be segmented if necessary. In some embodiments, joints 414 may be made of a material designed to snap, while in other embodiments joints 414 can be perforated to enable snap detachment of sections of slotted bracket 412. In some embodiments, slotted bracket 412 may have a handle similar to handle 490 discussed with respect to FIG. 4B.

The brackets discussed with respect to FIGS. 4A-4F (ganged bracket 402, link bracket 408, subgroup bracket 409, slotted bracket 412) may be constructed of a variety of materials, including but not limited to rigid materials (e.g., plastic, metals, etc.), flexible materials (e.g., rubber, compliant materials, etc.), or semi-rigid materials. In various embodiments, each bracket can be constructed with both rigid and flexible sections. As a non-limiting example, the portion of the bracket configured to hold each ferrule carrier can be made of a more rigid material, while a more flexible material is used to interconnect each rigid portion.

Figure 5A:
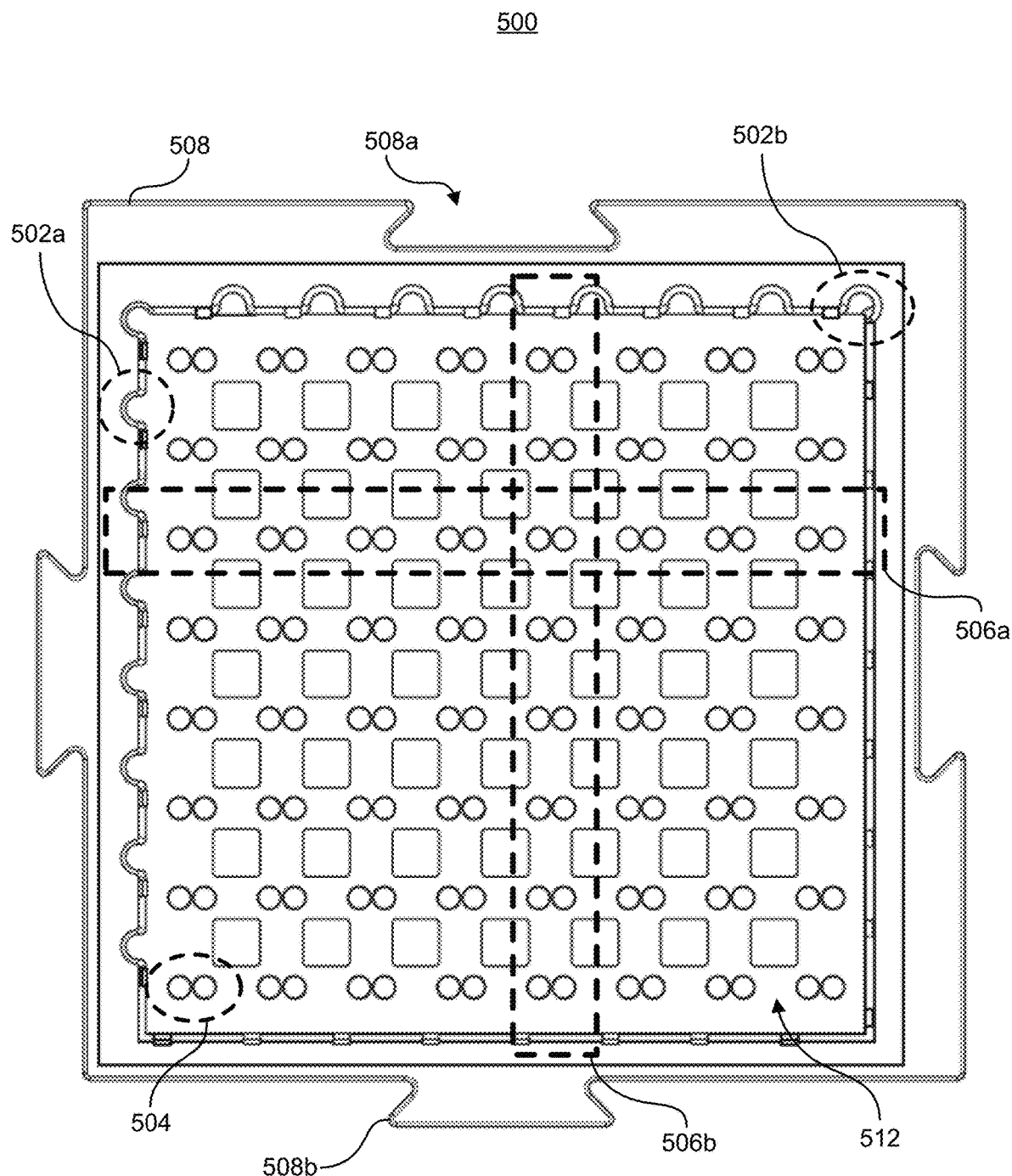
FIG. 5A is a front view of an example ferrule carrier adapter in accordance with embodiments of the technology disclosed herein.

As mentioned above, the different ferrule carriers can have a corresponding adapter into which the ferrule carriers are designed to be inserted. FIG. 5A is a front view of an example ferrule carrier adapter 500 in accordance with embodiments of the technology disclosed herein. As illustrated, ferrule carrier adapter 500 may comprise a plurality of carrier keying features 502 along an interior of ferrule carrier adapter 500. In various embodiments, carrier keying features 502 may be configured to mate with a corresponding carrier alignment features of ferrule carrier 200. In various embodiments, hinge 206 (discussed with respect to FIG. 2A) may comprise the corresponding carrier alignment feature configured to mate with a carrier keying feature 502 in some embodiments. In other embodiments, each ferrule carrier 200 may include a separate carrier alignment feature (not shown in FIGS. 2A 2C) configured to mate with one or more carrier keying features 502 of ferrule carrier adapter 100.

In various embodiments, carrier keying features 502a, 502b may be disposed on both sides of an adapter mid-wall 512. Adapter mid-wall 512 may serve to divide ferrule carrier adapter 500 into two sides, each side comprising an interior configured to accept a plurality of ferrule carriers 200. In various embodiments, adapter mid-wall 512 may comprise a 2D array of ferrule mating sleeves 504. Each ferrule mating sleeve 504 may be configured to accept a simplex ferrule (such as simplex ferrule 101a, 101b discussed with respect to FIG. 1), enabling mating with a corresponding simplex ferrule of another ferrule carrier 200 on the opposite side of adapter mid-wall 512. In various embodiments, a pair of ferrule mating sleeves 504 may be configured to align with ferrules extending out from a ferrule bay opening of an ferrule carrier 200 such that, when the ferrule carrier is inserted into ferrule carrier adapter 500, each simplex ferrule 101a, 101b is inserted into one of ferrule mating sleeves 504.

Figure 5B:
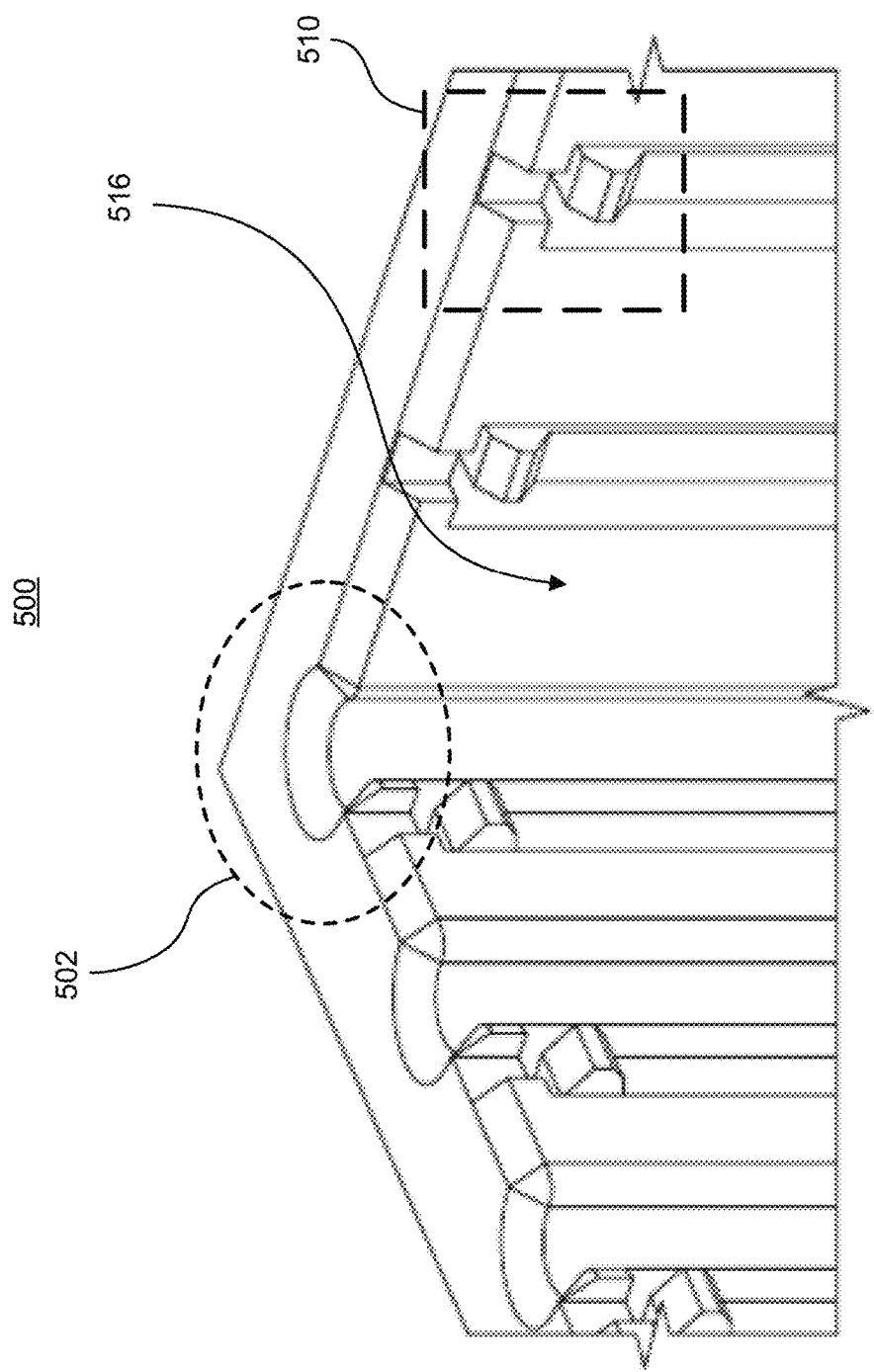
FIG. 5B is an expanded view of the interior of the example ferrule carrier adapter of FIG. 5A in accordance with embodiments of the technology disclosed herein.
Figure 5C:
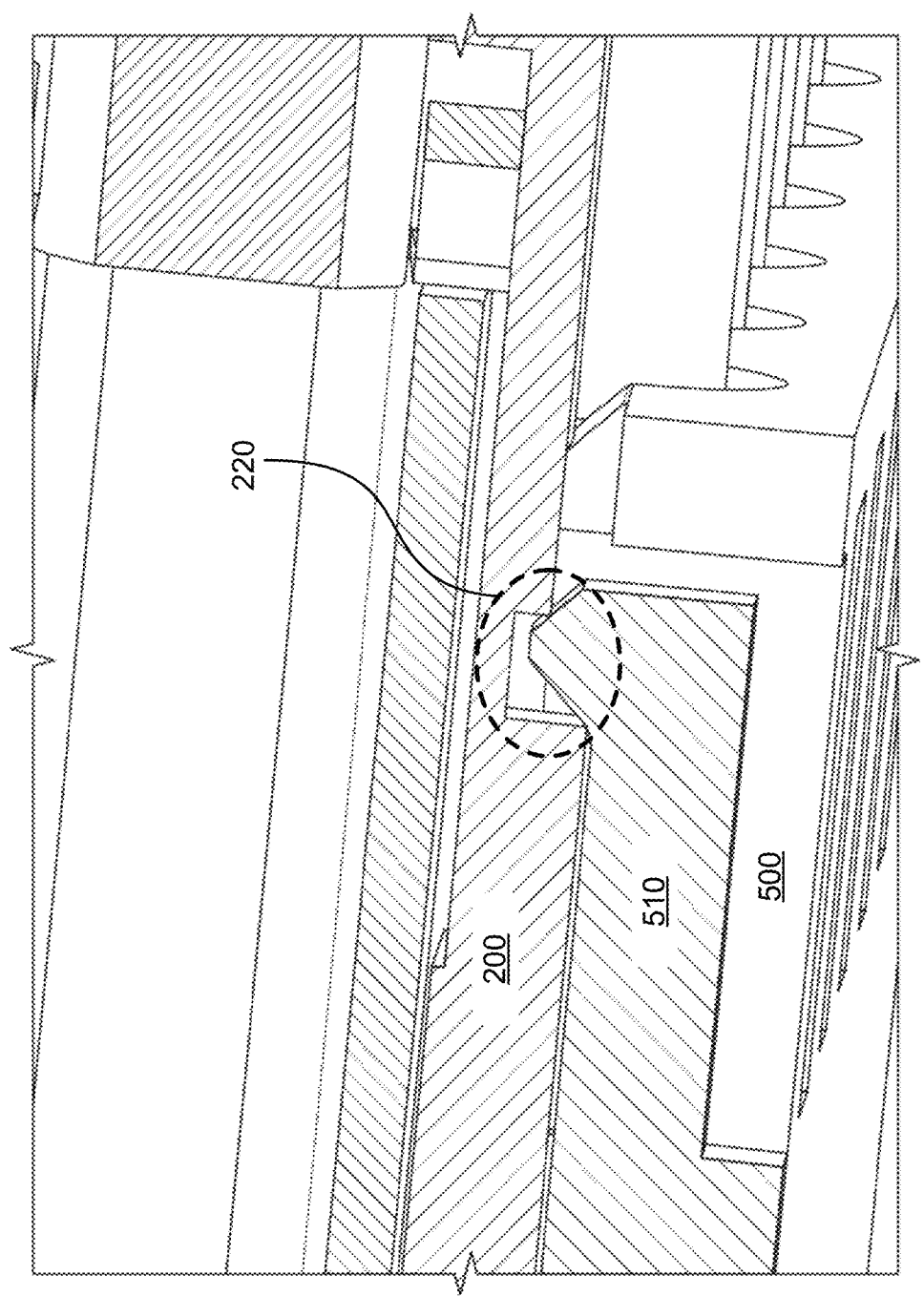
FIG. 5C is a cross-section view of the ferrule carrier adapter of FIG. 5A in accordance with embodiments of the technology disclosed herein.
Figure 5D:
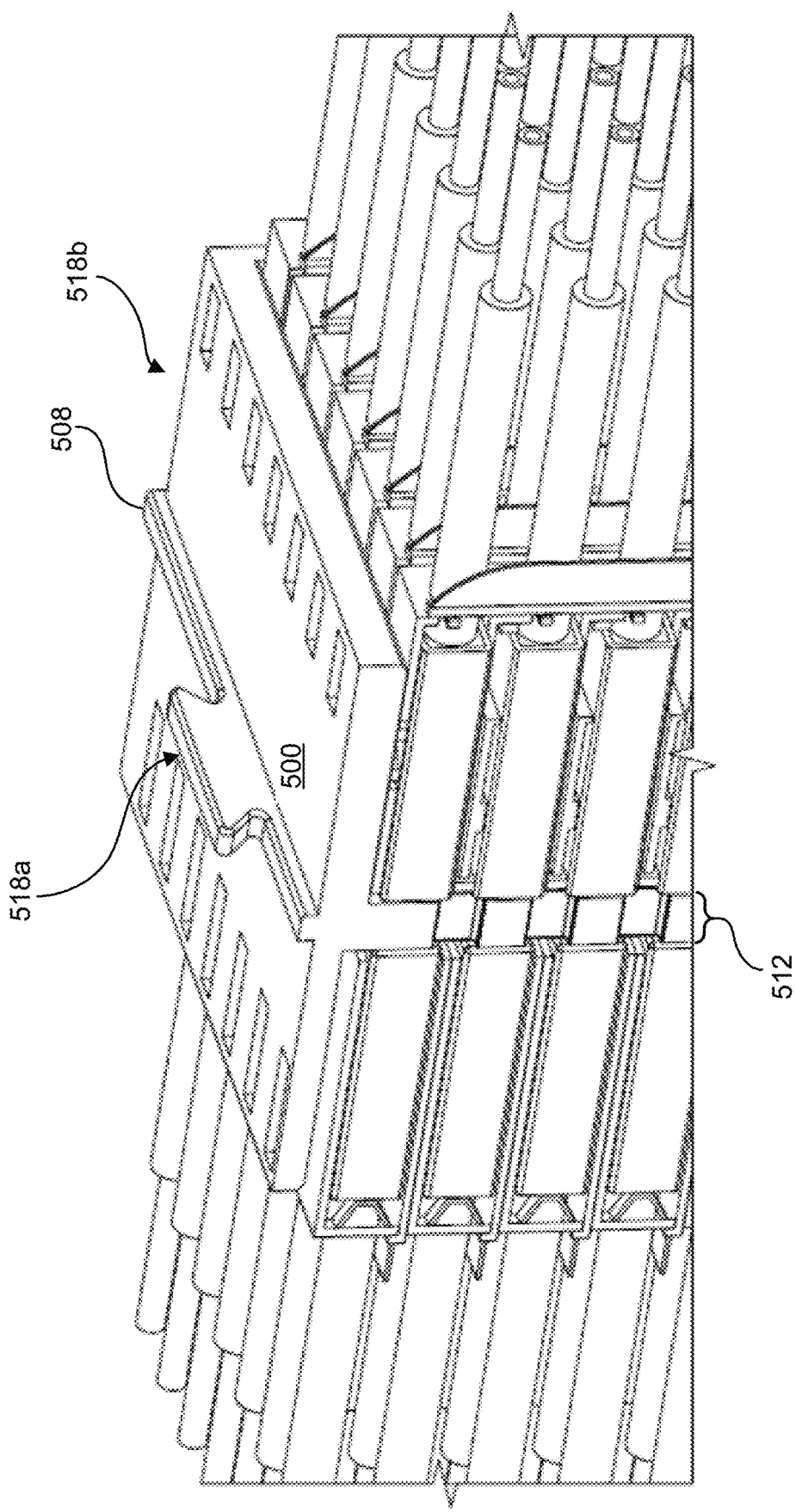
FIG. 5D is another cross-sectional view of the ferrule carrier adapter of FIG. 5A in accordance with embodiments of the technology disclosed herein.

As illustrated in FIG. 5D, adapter mid-wall 512 separates ferrule carrier adapter 500 into two sides, a first adapter side 518a and a second adapter side 518b. In various embodiments, first adapter side 518a and second adapter side 518b may be configured such as the interior discussed above with respect to FIG. 5A. As illustrated in FIG. 5D, each adapter side 518a, 518b is configured to accept a plurality of ferrule carriers 200 in one of two orientations (i.e., parallel orientation 200P or serial orientation 200S discussed with respect to FIGS. 2B and 2C above). The front wall of each ferrule carrier 200 couples to adapter mid-wall 512 such that the simplex ferrules of each ferrule carrier 200 within the first adapter side 518a are inserted within ferrule mating sleeves to mate with simplex ferrules of ferrule carriers 200 within the second adapter side 518b. In various embodiments, adapter mid-wall 512 may have a width such that, when the ferrules are mated through the plurality of ferrule mating sleeves, a front wall of the ferrule carrier 200 abuts adapter mid-wall 512. In other embodiments, adapter mid-wall 512 may have a smaller width with one or more projections configured to abut the front wall of each ferrule carrier.

To facilitate reconfigurability, the interior (interior 515 illustrated in FIG. 5B) of ferrule carrier adapter 500 may be open, lacking dividers between rows or columns of ferrule mating sleeves 504. As illustrated in FIG. 5A, a ferrule carrier may be inserted into ferrule carrier adapter 500 in a horizontal orientation 506a or a vertical orientation 506b. In various embodiments, orthogonal mating between two ferrule carriers on opposite sides of adapter mid-wall 512 is facilitated by inserting a first set of ferrule carriers 200 in a horizontal orientation 506a on one side of ferrule carrier adapter 500, and inserting a second set of ferrule carriers 200 (in a different configuration from the first set of ferrule carriers 200) in a vertical orientation 506b on the opposite side of ferrule carrier adapter 500. As a non-limiting example, the first set of ferrule carriers 200 can be in a serial configuration, such as serial configuration ferrule carrier 200S discussed with respect to FIG. 2C, and the second set of ferrule carriers 200 can be in the parallel configuration (ferrule carriers 200P) discussed with respect to FIG. 2B. In this way, each ferrule carrier of the second set of ferrule carriers may have a connection with each of the ferrule carriers in the first set of ferrule carriers in ferrule carrier adapter 500. Although illustrated as an 8×8 matrix (i.e., having eight horizontal orientation 506a slots or eight vertical orientation 506b slots), in other embodiments ferrule carrier adapter 500 may include fewer slots configured to accept a ferrule carrier with accordingly fewer number of duplex ferrules disposed therein, such as one or more of the optical connectors discussed above with respect to FIGS. 4A-4F. In some other embodiments, a greater number of slots may be included with accordingly greater number of duplex ferrules. As a non-limiting example, ferrule carrier adapter 500 may comprise a 6×6 matrix, meaning that each side of ferrule carrier adapter 500 may accept six ferrule carriers (in either parallel or serial configuration) where each ferrule carrier holds four duplex ferrules (such as optical connectors discussed with respect to FIGS. 4A-4F). A person of ordinary skill in the art would appreciate that the subject matter is not limited to a particular size, but ferrule carrier adapter 500 may be sized as required for a given implementation.

As illustrated in FIG. 5B, a plurality of carrier retention features 510 can be disposed within the interior 516 of ferrule carrier adapter 500. Carrier retention features 510 may be configured to secure each ferrule carrier 200 within the first adapter side 518a or the second adapter side 518b. An example of how carrier retention feature 510 interacts with an example ferrule carrier (i.e., ferrule carrier 200) is illustrated in FIG. 5C. FIG. 5C is a cross sectional view of ferrule carrier adapter 500 shown in FIG. 5A. As shown in FIG. 5C, carrier retention feature 510 is configured to mate with a carrier securing feature 220 of ferrule carrier 200. In various embodiments, carrier securing feature 220 may be disposed on carrier base 201 and/or the carrier lid of ferrule carrier 200 (not shown in FIG. 2A). Carrier retention features 510 may be disposed such that each carrier retention feature 510 is configured to mate with a carrier securing feature 220 on carrier base 201 or the carrier lid of ferrule carrier 200. In various embodiments, carrier retention feature 510 may be a latch and carrier securing feature 220 may be an opening (as illustrated in FIG. 5D) such that, when installed into ferrule carrier adapter 500, carrier retention feature 510 couples to carrier securing feature 220. Carrier retention features 510 may be configured to provide sufficient bias on ferrule carrier 200 to maintain ferrule carrier 200 properly installed within ferrule carrier adapter 500. In various embodiments, ferrule carrier adapter 500 may include a carrier release (not shown in FIG. 5C) configured to uncouple carrier retention feature 510 from carrier securing feature 220 of ferrule carrier 200. In some embodiments, a separate carrier release may be provided for each carrier retention feature 510 such that each ferrule carrier 200 may be decoupled from ferrule carrier adapter 500 individually, while in other embodiments a carrier release may be configured to control one or more carrier retention features 510.

As discussed above, modern parallel fiber connectors enable higher fiber density than the use of connectors utilizing simplex ferrules (either single simplex ferrules or duplex-style connectors). However, parallel fiber connectors are fixed on the fibers themselves, requiring expensive and complex fiber shuffles with fixed routing configurations. The use of fiber shuffles extends the lead time for installation due to long design cycles, and reduces configuration flexibility and scalability of the system. Modern duplex ferrule connectors are easier to route within the system without the need for the expensive fiber shuffles, but are designed for external robust inter-rack cable applications and have large housing sizes, reducing the density of cables when supporting high optical fiber counts. By using embodiments in accordance with the technology disclosed herein, the density benefits of parallel fiber connectors are achieved through the use of duplex ferrules, thereby reducing the need for expensive fiber shuffles while obtaining the low-loss optical coupling benefits of the duplex ferrules.

As mentioned above, embodiments of the technology disclosed herein provides for modular customization of optical connectivity in a low-cost, low-loss, high density manner. In various embodiments, ferrule carrier adapters 500 may be connected together, enabling more optical fibers to be communicatively coupled together in an easier to reconfigure arrangement. As illustrated in FIG. 5A, ferrule carrier adapter 500 may include an adapter mating surface 508 for mounting ferrule carrier adapters 500 in the system. In various embodiments, adapter mating surface 508 may comprise a raised rim along the exterior of each ferrule carrier adapter 500 (as illustrated by adapter mating surface 508 in FIG. 5D). Adapter mating surface 508 may include one or more gendered mounting structures, such as female mounting structure 508a and male mounting structure 508b.

Figure 6:
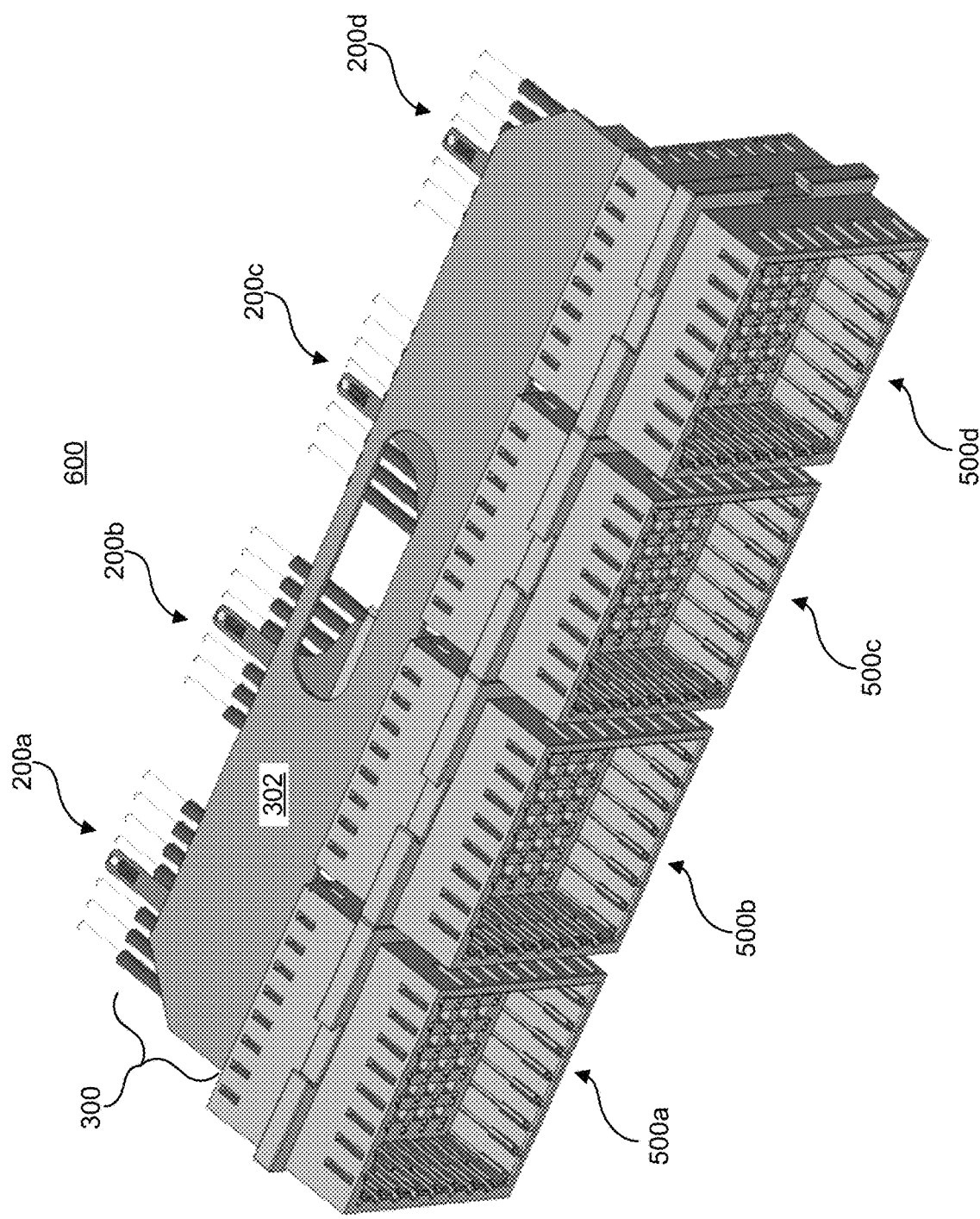
FIG. 6 is an example adapter apparatus in accordance with embodiments of the technology disclosed herein.

FIG. 6 illustrates an example adapter apparatus 600 in accordance with embodiments of the technology disclosed herein. As shown, four adapters 500 are connected together to form a 1×4 adaptor apparatus 600. Each adapter 500a, 500b, 500c, 500d can be associated with ferrule carriers of a particular position in the implemented optical connector. For ease of discussion, adapter apparatus 600 and the overall system architecture shall be discussed with respect to using example optical connector 300 discussed with respect to FIGS. 3A and 3B. In various embodiments, adapter apparatus 600 can include an adapter bracket (not shown in FIG. 6) to provide additional stability to adapter apparatus 600 compared to directly connecting adapters 500 to each other. As illustrated in FIG. 6, one of the ferrule carriers 200 of optical connector 300 is inserted into a horizontal slot on one side of adapters 500a, 500b, 500c, 500d in the adapter apparatus 600. Ferrule carriers 200c, 200d are fully mated with adapters 500c, 500d, respectfully, while ferrule carriers 200a, 200b are not yet fully mated in adapters 500a, 500b, respectively. Although bracket 302 is in position, the independent floating feature of each ferrule carrier 200 reduces the mating force for each duplex ferrule. Bracket 302 provides a structure for the ferrule carriers 200a, 200b, 200c and 200d to be in the same order of the adapter 500a, 500b, 500c and 500d. Different sizes of bracket 302 may be used to scale the number of ferrule carriers 200 for each application needs.

Figure 7C:
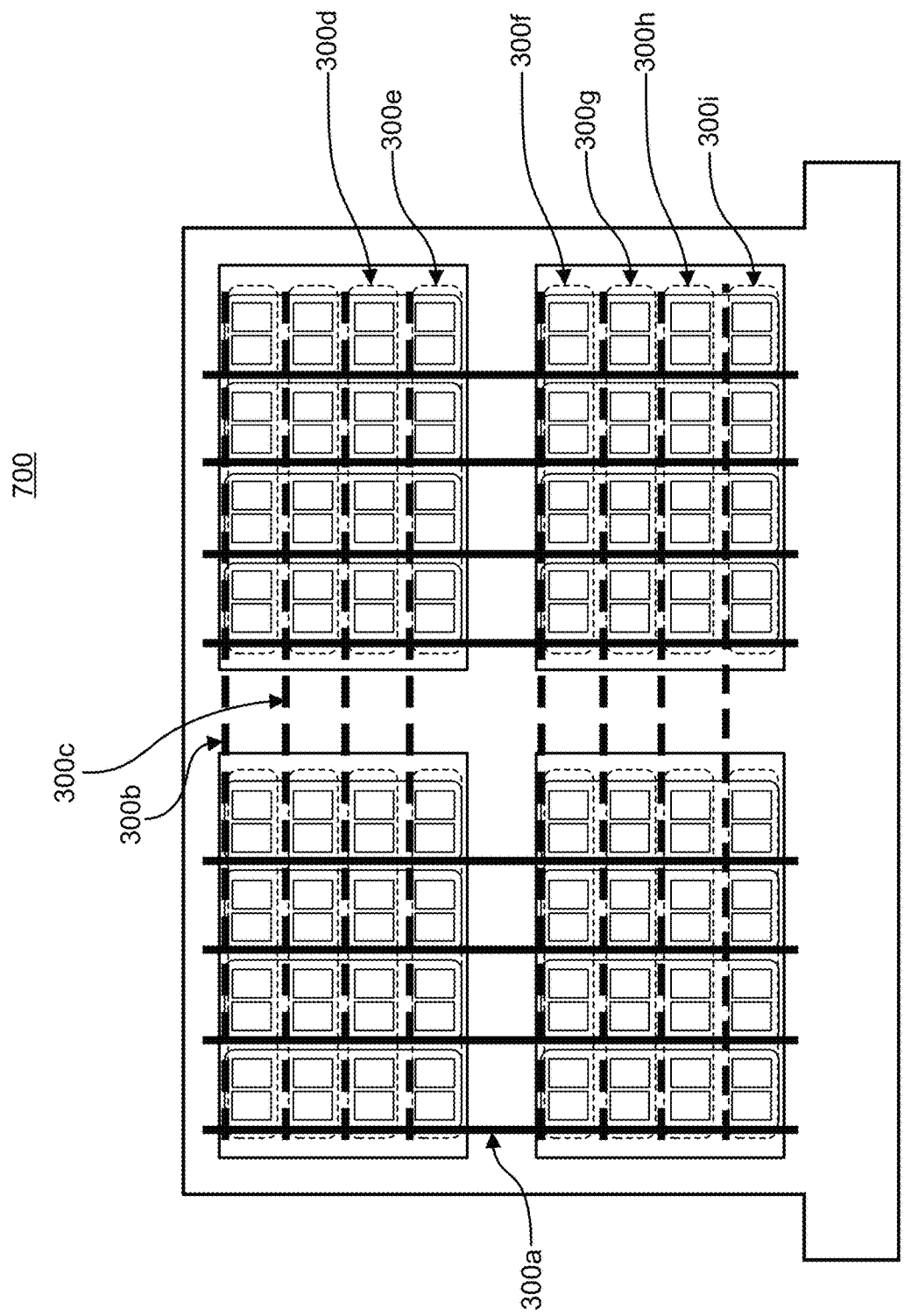
FIG. 7C is a front view of an example adapter apparatus, looking through a first side in accordance with embodiments of the technology disclosed herein.
Figure 8:
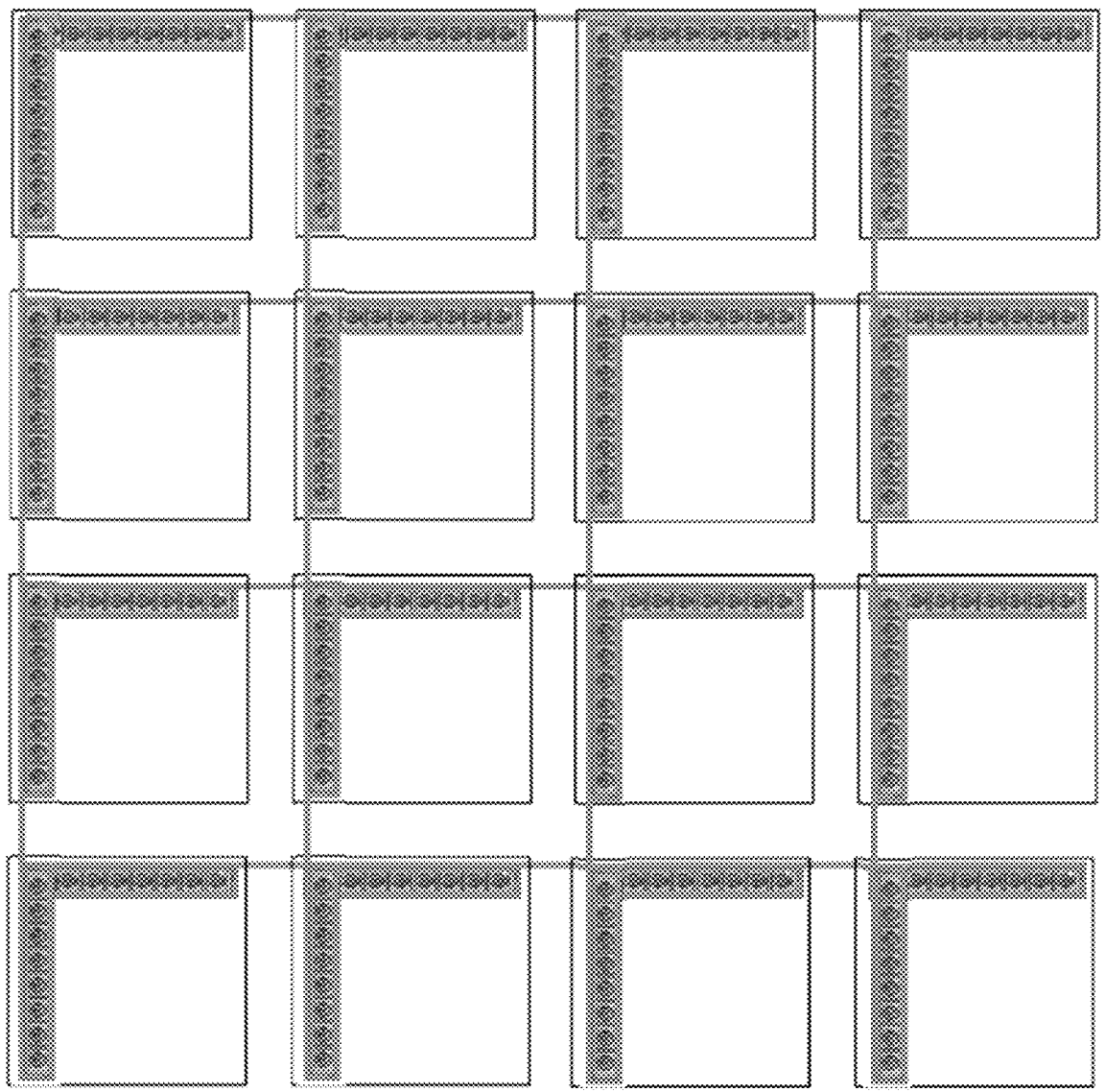
FIG. 8 shows an example 4×4 configuration for an adapter apparatus in accordance with embodiments of the technology disclosed herein.

Although illustrated in a 1×4 configuration, a person of ordinary skill in the art should not limit the scope of adapter apparatus 600 to only this configuration. FIGS. 7A-7C illustrate another example adapter apparatus in a 2×2 configuration. As another non-limiting example, FIG. 8 shows a 4×4 configuration for the adapter apparatus. In various embodiments, these different configurations of adapter apparatuses can be dispersed within a node in a system, used to connect nodes at the row or column level, and/or at the rack-level (e.g., placing adapter apparatus between two sets of racks to be connected).

FIGS. 7A and 7B illustrate a first side 702 and a second side 704 of an example adapter apparatus 700 in accordance with embodiments of the technology disclosed herein. FIGS. 7A and 7B provide an illustration of how optical connectors connect within adapter apparatus 600a to provide all-to-all connectivity. In various embodiments, adapter apparatus 700 includes an adapter bracket 706 configured with one or more adapter slots configured to accept an adapter 500. In the illustrated embodiment, adapter apparatus 700 includes four adapter slots, with adapters 500a, 500b, 500c, 500d disposed within the adapter slots. FIG. 7C is a front view of adapter apparatus 700, looking through first side 702. Ganged optical connectors 300 inserted on second side 704 are illustrated with broken lines, indicating that the view is through the mid-wall of each adapter 500a, 500b, 500c, 500d. When optical connectors are inserted into both sides of a respective adapter, each node associated with an optical connector 300 is connected to every node associated with ferrule carriers on the other side of the adapter mid-wall. As illustrated, ganged optical connector 300a is optically coupled to each gang optical connector 300b-300i on the other side of adapter apparatus 700. In this way, optical routing of the signals in the optical connectors is capable without the need for fiber shuffles, allowing easier and more cost efficient all-to-all connectivity. The use of fiber shuffles extends the lead time for installation due to long design cycles, and reduces configuration flexibility and scalability of the system. Modern duplex ferrule connectors are easier to route within the system without the need for the expensive fiber shuffles, but are designed for external robust inter-rack cable applications and have large housing sizes, reducing the density of cables when supporting high optical fiber counts. By using embodiments in accordance with the technology disclosed herein, the density benefits of parallel fiber connectors are achieved through the use of duplex ferrules, thereby reducing the need for expensive fiber shuffles while obtaining the low-loss optical coupling benefits of the duplex ferrules.

To further reduce mating forces, embodiments of the technology disclosed herein can utilize non-contact simplex ferrules in the ferrule carriers. FIGS. 9A-9E illustrate example non-contact simplex ferrules in accordance with embodiments of the technology disclosed herein. Each of the example non-contact simplex ferrules can be used by themselves for simplex connections, or combined with one or more non-contact simplex ferrules to form a multiple fiber core connector (e.g., duplex ferrule 100 discussed with respect to FIG. 1). A person of ordinary skill in the art would understand that each non-contact simplex ferrule could be used within the ferrule carriers discussed above with respect to FIGS. 3A-8 without undue effort. By utilizing non-contact ferrules, embodiments of the present disclosure can further reduce the mating force needed compared to modern physical contact ferrules.

Figure 9A:
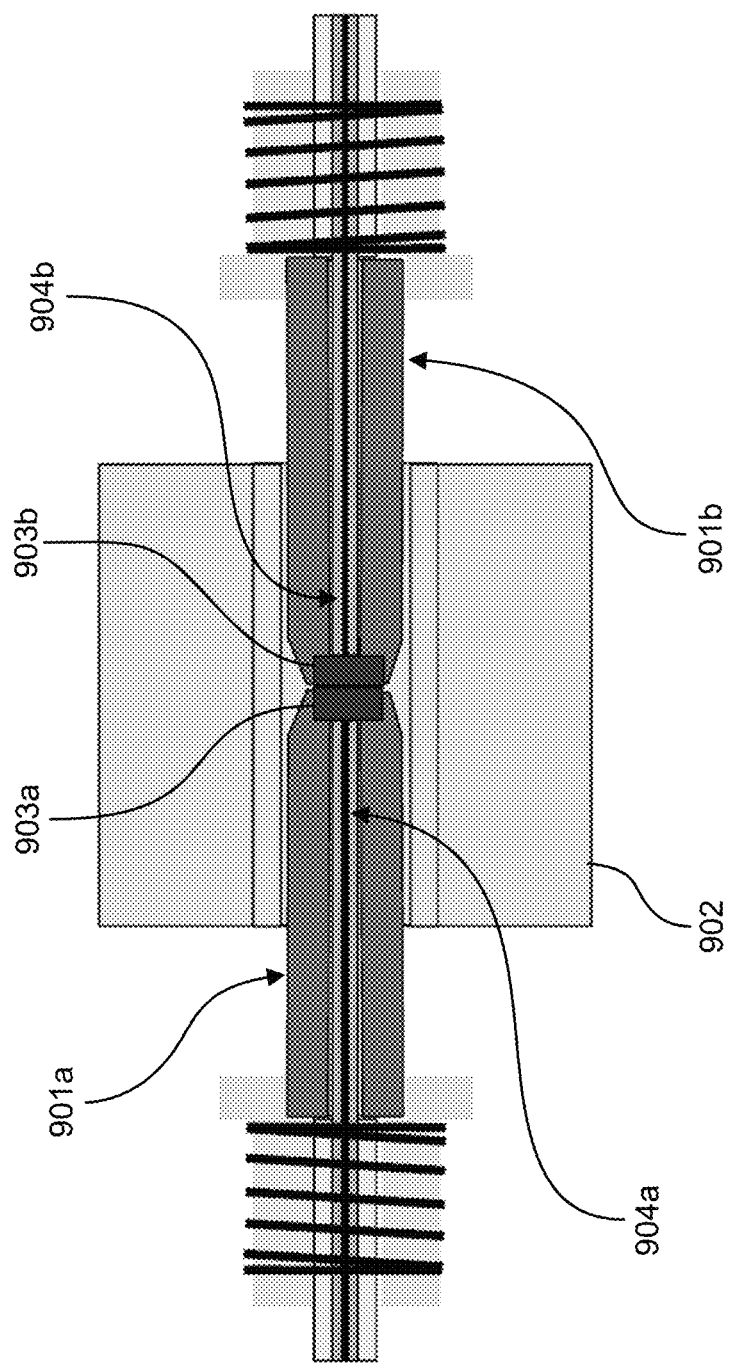
FIG. 9A is a cross-sectional view of an example mating of non-contact simplex ferrules in accordance with embodiments of the technology disclosed herein.

FIG. 9A is a cross-sectional view of an example mating of non-contact simplex ferrules in accordance with embodiments of the technology disclosed herein. The example in FIG. 9A is provided for illustrative purposes only and to help describe the subject matter, and should not be interpreted to limit the scope of the present disclosure to only the illustrative example. As shown in FIG. 9A, two simplex ferrules 901a, 901b are optically coupled together within a mating sleeve 902. In various embodiments, mating sleeve 902 can be ferrule mating sleeves 504 discussed above with respect to FIG. 5A. Each simplex ferrule 901a, 901b can include an index matching material 903a, 903b disposed on the tip of simplex ferrule 901a, 901b, respectively. Index matching material 903a, 903b is a substance, which is not as hard as the fiber cores' glass, having an index of refraction that closely approximates the index of refraction of the fiber cores, reducing the impact of greater index differences between the fiber cores and air. Using index matching material 903a, 903b allows simplex ferrules 901a, 901b to be optically coupled without the fiber cores being physically "deformed" mated, as in modern optical connectors. Each fiber core 904a, 904b terminates at index matching material 903a, 903b, rather than at the end of simple ferrules 904a, 904b. In this way, the end of each fiber core is not physically mated when the two simplex ferrules 901a, 901b are connected. The embodiment shown in FIG. 9A is considered non-contact because the fiber cores are not physically contracted, even though the index matching materials 903a, 903b may be physically connected or a small air gap between the index matching materials 903a, 903b.

Figure 9B:
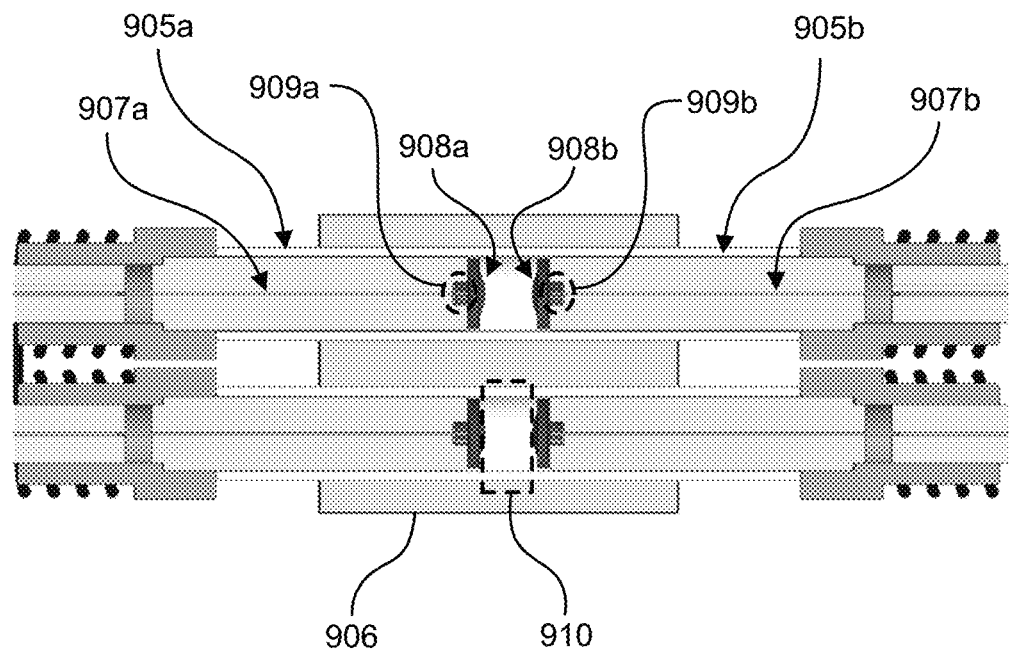
FIG. 9B is a cross-sectional view of an example mating of example lens capped non-contact simplex ferrules in accordance with embodiments of the technology disclosed herein.
Figure 9C:
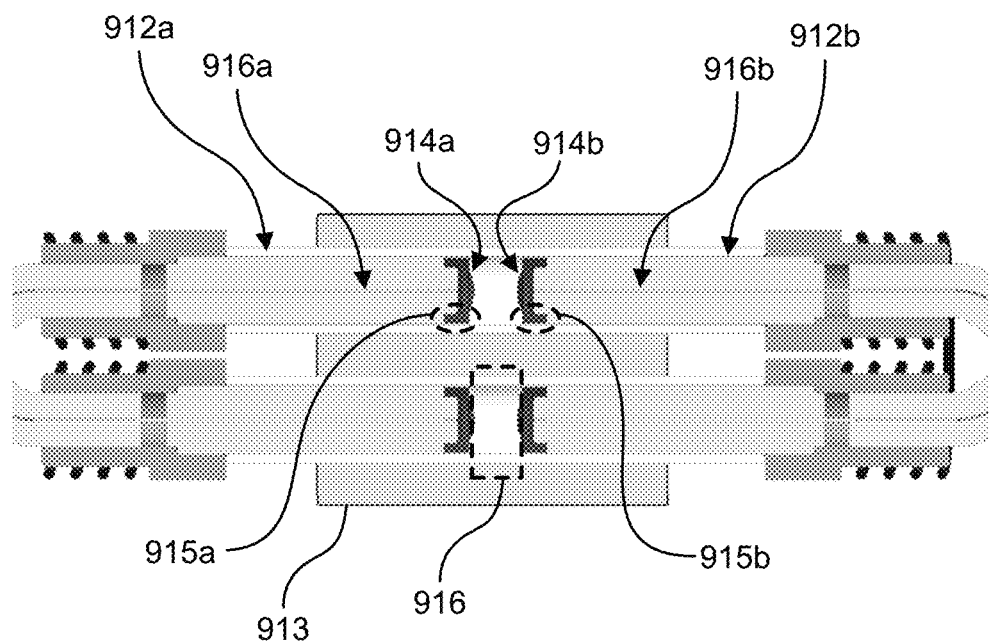
FIG. 9C is a cross-sectional view of an example mating of another example lens capped non-contact simplex ferrules in accordance with embodiments of the technology disclosed herein.

Reducing the need for physical contact protects the fiber cores from damage due to misapplication of force during mating, and reduces the effect of dirt and other particulates from contacting the fiber cores and impacting the effectiveness of the optical coupling performance. In various embodiments, index matching material 903a, 903b can comprise one or more of lenses, thin films, curable fluids, among others. FIGS. 9B and 9C are cross-sectional view of example mating of non-contact simplex ferrules with ferrule-attached lenses in accordance with embodiments of the technology disclosed herein. FIG. 9B shows the mating between example lens capped non-contact simplex ferrules 905a, 905b in accordance with the present disclosure. As shown, two lens capped non-contact simplex ferrules 905a, 905b are optically coupled within a mating sleeve 906. In various embodiments, mating sleeve 906 can be ferrule mating sleeves 504 discussed above with respect to FIG. 5A. A center post lens 908a, 908b is disposed on the end of each lens capped non-contact simplex ferrule 905a, 905b, respectively. Each fiber core 907a, 907b terminates at its respective center post lens 908a, 908b, and in some embodiments each fiber core 907a, 907b can be terminated within the center post 909a, 909b of each center post lens 908a, 908b. In various embodiments, center post lens 908a, 908b includes a center post 909a, 909b to assist in aligning each center post lens 908a, 908b with its associated fiber core 907a, 907b. Two associated lens capped non-contact simplex ferrules 905a, 905b can be configured such that, when inserted into mating sleeve 906, an air gap 910 is maintained between each lens capped non-contact simplex ferrules 905a, 905b. In this way, optical coupling occurs through the center post lenses 908a, 908b over the air, rather than through direct physical contact. The lack of a need to deform the fiber core end faces together to optically couple fiber cores reduces the mating force required to connect the fibers. The end faces of the center post lenses 908a, 908b may be coated with an anti-reflection material to minimize optical reflections.

FIG. 9C shows a cross-sectional view of the mating of example lens capped non-contact simplex ferrules 912a, 912b in accordance with embodiments of the technology disclosed herein. Unlike the lens capped non-contact simplex ferrules 905a, 905b of FIG. 9B, the end cap lens 914a, 914b of the embodiment in FIG. 9C does not include a center post to assist in aligning with each fiber core 916a, 916b. Instead, end cap lens 914a, 914b can include a side wall 915a, 915b creating an area to accept the end of a simplex ferrule 912a, 912b. As illustrated in FIG. 9C, side wall 915a, 915b can have a circumference configured to cover a protruding end of a simplex ferrule 912a, 912b. By encompassing the whole end of the simplex ferrule, end cap lens 914a, 914b can be disposed without the need for additional alignment features. When corresponding lens capped non-contact simplex ferrules 912a, 912b are mated within mating sleeve 913, an air gap 916 is created between the ends of each ferrule 912a, 912b. The air gap 916 can serve the same purpose as the air gap 906 discussed above with respect to FIG. 9B. The end faces of the end cap lenses 914a, 914b may be coated with an anti-reflection material to minimize optical reflections.

Figure 9D:
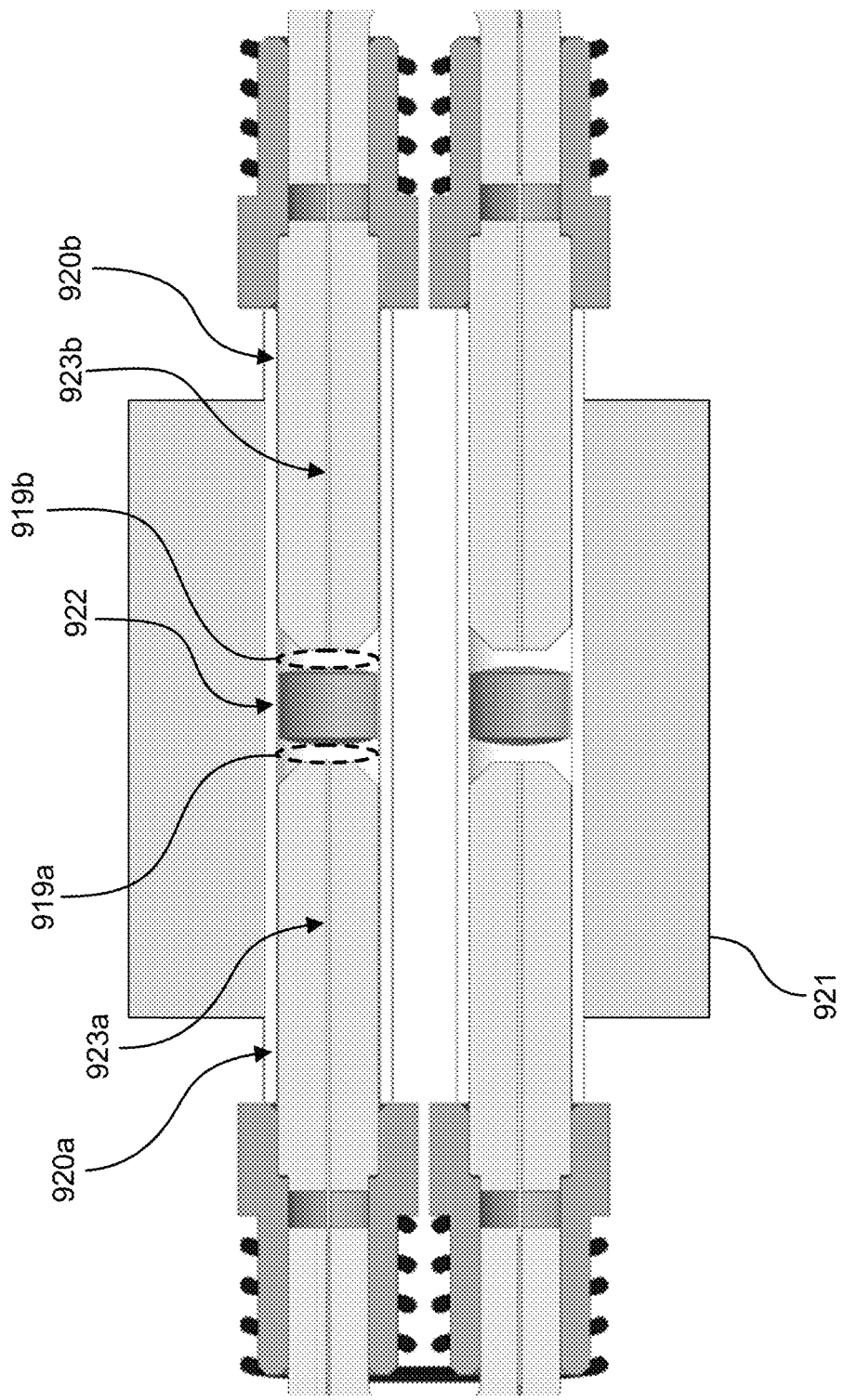
FIG. 9D illustrates a cross-sectional view of the mating of example non-contact simplex ferrules in accordance with embodiments of the technology disclosed herein.

In some embodiments, the mating sleeve can include an embedded optical device to enable two simplex ferrules to optical couple in a non-contact manner. FIG. 9D shows a cross-sectional view of the mating of example non-contact simplex ferrules 920a, 920b in accordance with embodiments of the technology disclosed herein. As shown in FIG. 9D, an optical device 922 is disposed inside mating sleeve 921. In various embodiments, optical device 922 may comprise a lens, including but not limited to an aspherical lens, a ball lens, a graded index lens, among others. In other embodiments, optical device 922 may comprise a functional optical device, including but not limited to a lens, a dichroic mirror, an optical filter, an optical isolator, a quarter or half-wave plate, a polarizer, a partially reflecting mirror, among other functional optical devices. A functional optical device can be used to perform beam shaping or focusing of the light signal from the end of one fiber core 916a to the other fiber core 916b, or vice versa. In various embodiments, mating sleeve 921 can be configured such that, when non-contact simplex ferrules 920a, 920b are mated inside mating sleeve 921, a first air gap 919a is created between the end of non-contact simplex ferrule 920a and optical device 922 and a second air gap 919b is created between the end of non-contact simplex ferrule 920b and optical device 922. In this way, no additional modification of the non-contact simplex ferrules is required (e.g., adding a lens to the ferrule). In some embodiments, utilizing optical device 922 allows for using physical contact ferrules in a non-contact manner, thereby reducing the cost associated with specialized non-contact ferrules and reducing potential damage caused through physical contact.

FIG. 10A shows an example construction of mating sleeve 921 in accordance with embodiments of the technology disclosed herein. As illustrated, mating sleeve 921 can comprise two sleeve sections 921a, 921b. Optical device 922 can comprise one or more extensions 923 in various embodiments to connect optical device 922 to both sleeve sections 921a, 921b, while in other embodiments the one or more extensions 923 may comprise a cylindrical wall extending into the interior of each sleeve section 921a, 921b to connect the optical device 922 to the two sleeve portions 921a, 921b. In some embodiments, mating sleeve 921 can be disposed within a mid-wall of an adapter, such as adapter 500 discussed above with respect to FIGS. 5A-5D. In some embodiments, each adapter may be configured to enable the mating sleeves to be interchangeable, allowing for the same adapter to be utilized for different types of optical connections by including one or more mating sleeves 921 having the required optical device 922 for an intended purpose.

FIG. 10B shows another example construction of mating sleeve 921 in accordance with embodiments of the technology disclosed herein. As illustrated, mating sleeve 921 includes an opening 924 configured to allow optical device 922 to be dropped into mating sleeve 921. In this way, creating a customized mating sleeve for an intended purpose is easier, simply requiring the decision of the type of optical device to include. To keep optical device 922 in place, a plurality of retention rims 925 are disposed on each side of opening 924, in the interior of mating sleeve 921. After dropping in optical device 922, a securing epoxy or other material can be used to secure optical device 922 in mating sleeve 921. Similar to the mating sleeve discussed with respect to FIG. 9A, either of the mating sleeves of FIG. 9B-10B can be disposed in the mid-wall of an adapter in different embodiments, and can be interchanged as needed.

Implementing systems in accordance with embodiments of the technology disclosed herein facilitates parallel fiber connector-type fiber management and density with the use of simplex ferrules, eliminating the need for expensive fiber shuffles to route fibers for all-to-all connectivity required for modern parallel fiber connectors while obtaining the low-loss optical coupling benefits of modern simplex ferrules. The ferrule carriers disclosed in the present disclosure facilitate organization of duplex ferrules, serving as a "parallel fiber" of duplex ferrules. Independently floating each ferrule carrier in an optical connector allows for the mating force to be spread across the various optical connectors, reducing the mating force for any specific ferrule carrier while making scalability easier. In various embodiments, adapters enable orthogonal mating of different ferrule carriers, providing all-to-all connectivity within the system without the need for fiber shuffles. In other embodiments, adapters enable parallel mating of different ferrule carriers.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An optical connector comprising:
   a plurality of ferrule carriers, each ferrule carrier comprising:
   a base comprising one or more ferrule bays, each ferrule bay configured to hold a duplex ferrule;
   each ferrule bay comprising at least one ferrule retainment feature configured to secure the duplex ferrule of each ferrule bay; and
   at least one bracket connection feature disposed on an exterior surface of the base;
   a bracket configured to gang the plurality of ferrule carriers, each ferrule carrier connected to the bracket by the at least one bracket connection feature,
   wherein each ferrule carrier of the plurality of ferrule carriers is moveably connected to the bracket and can independently float along an axis independently of each other ferrule carrier of the plurality of ferrule carriers.

2. The optical connector of claim 1, wherein a configuration type of each ferrule carrier of the plurality of ferrule carriers is determined based on an orientation of the duplex ferrule within each ferrule bay.

3. The optical connector of claim 1, the bracket comprising a plurality of carrier receptacles disposed on a bottom side of the bracket, wherein a number of carrier receptacles is equal to a number of ferrule carriers of the plurality of ferrule carriers.

4. The optical connector of claim 3, the at least one bracket connection feature comprising at least one side rail, each carrier receptacle further comprising at least one rail interface configured to accept the at least one side rail.

5. The optical connector of claim 1, wherein the bracket comprises a plurality of channels configured to accept the at least one bracket connection feature of each ferrule carrier to create a ganged optical connector comprising the plurality of ferrule carriers.

6. The optical connector of claim 5, each ferrule carrier comprises a subgroup of ferrule carriers, wherein each ferrule carrier of the subgroup of ferrule carriers is associated with at least one channel of the bracket for connection.

7. The optical connector of claim 6, each ferrule carrier in the subgroup of ferrule carriers is configured to move independently of each other ferrule carrier in the subgroup of ferrule carriers.

8. The optical connector of claim 1, wherein the bracket comprises one or more link brackets configured to connect two adjacent ferrule carriers of the plurality of ferrule carriers.

9. The optical connector of claim 8, wherein each ferrule carrier comprises a subgroup of ferrule carriers.

10. The optical connector of claim 9, further comprising one or more subgroup brackets configured to connect two adjacent ferrule carriers within each subgroup of ferrule carriers.

11. A system, comprising:
a plurality of optical connectors, each optical connector comprising:
  a plurality of ferrule carriers, each ferrule carrier comprising:
    a base comprising one or more ferrule bays, each ferrule bay configured to hold a duplex ferrule;
    each ferrule bay comprising at least one ferrule retainment feature configured to secure the duplex ferrule of each ferrule bay; and
    at least one bracket connection feature disposed on an exterior surface of the base;
  a bracket configured to gang the plurality of ferrule carriers, each ferrule carrier connected to the bracket by the at least one bracket connection feature;
a plurality of ferrule carrier adapters configured to accept the plurality of optical connectors, each of the ferrule carrier adapters comprising:
  an adapter mid-wall comprising a plurality of ferrule mating sleeves;
  a first adapter side configured to accept a first set of ferrule carriers of a first subset of optical connectors;
  a second adapter side configured to accept a first set of ferrule carriers of a second subset of optical connectors,
  wherein the first set of ferrule carriers of the first subset of optical connectors are configured to mate with the first set of ferrule carriers of the second subset of optical connectors through the plurality of ferrule mating sleeves of the adapter mid-wall;
  wherein each ferrule carrier is free to move along an axis independently of each other ferrule carrier in a same optical connector.

12. The system of claim 11, wherein a configuration type of each ferrule carrier of the plurality of ferrule carriers is determined based on an orientation of the duplex ferrule within each ferrule bay.

13. The system of claim 11, the bracket comprising a plurality of carrier receptacles disposed on a bottom side of the bracket, wherein a number of carrier receptacles is equal to a number of ferrule carriers of the plurality of ferrule carriers.

14. The system of claim 11, wherein the first set of ferrule carriers of the first subset of optical connectors are orthogonally mated to the first set of ferrule carriers of the second subset of optical connectors.

15. The system of claim 11, wherein the plurality of ferrule mating sleeves comprise an optical device disposed in a space in between a first end of a ferrule mating sleeve and a second end of a ferrule mating sleeve.

16. The system of claim 15, wherein the optical device comprises one of a lens, dichroic mirror, an optical filter, an optical isolator, a quarter plate, a half-wave plate, a polarizer, or a partially reflecting mirror.

17. The system of claim 15, wherein each ferrule mating sleeve is configurable to customize an optical coupling between a pair of duplex ferrules of corresponding ferrule carriers.

18. The system of claim 11, each ferrule carrier adapter of the plurality of adapters comprising an adapter mating surface disposed on an exterior of the ferrule carrier adapter.

19. The system of claim 18, wherein each ferrule carrier adapter comprises an adapter mating surface disposed on an exterior of the ferrule carrier adapter, the adapter mating surface comprising one or more mounting structures configured to mate with a corresponding mounting structure on an adapter bracket or another ferrule carrier adapter.

20. A system comprising:
a plurality of optical connectors, each optical connector comprising:
  a plurality of quad-duplex ferrule carriers, each quad-duplex ferrule carrier comprising:
    a base comprising four ferrule bays, each ferrule bay configured to hold a duplex ferrule;
    each ferrule bay comprising at least one ferrule retainment feature configured to secure the duplex ferrule of each ferrule bay; and
    at least one bracket connection feature disposed on an exterior surface of the base;
  a bracket configured to gang the plurality of quad-duplex ferrule carriers, each quad-duplex ferrule carrier connected to the bracket by the at least one bracket connection feature;
a plurality of ferrule carrier adapters configured to accept the plurality of optical connectors, each of the ferrule carrier adapters comprising:
  an adapter mid-wall comprising a plurality of ferrule mating sleeves;
  a first adapter side configured to accept a first set of quad-duplex ferrule carriers of a first subset of optical connectors;
  a second adapter side configured to accept a first set of quad-duplex ferrule carriers of a second subset of optical connectors,
  wherein the first set of quad-duplex ferrule carriers of the first subset of optical connectors are configured to mate with the first set of quad-duplex ferrule carriers of the second subset of optical connectors through the plurality of ferrule mating sleeves of the adapter mid-wall;
  wherein each quad-duplex ferrule carrier is free to move along an axis independently of each other quad-duplex ferrule carrier in a same optical connector.

* * * * *